US012676720B2

(12) United States Patent
Nilsson et al.

(10) Patent No.: US 12,676,720 B2
(45) Date of Patent: Jul. 7, 2026

(54) INDICATING A SUBSET OF TX RX ANTENNAS FOR SRS ANTENNA SWITCHING VIA MAC-CE

(71) Applicant: Telefonaktiebolaget LM Ericsson (PUBL), Stockholm (SE)

(72) Inventors: Andreas Nilsson, Gothenburg (SE); Helka-Liina Määttänen, Espoo (FI); Mattias Frenne, Uppsala (SE); Sven Jacobsson, Västra Frölunda (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 392 days.

(21) Appl. No.: 18/261,400

(22) PCT Filed: Jan. 18, 2022

(86) PCT No.: PCT/IB2022/050402
§ 371 (c)(1),
(2) Date: Jul. 13, 2023

(87) PCT Pub. No.: WO2022/153283
PCT Pub. Date: Jul. 21, 2022

(65) Prior Publication Data
US 2024/0080161 A1      Mar. 7, 2024

Related U.S. Application Data

(60) Provisional application No. 63/138,703, filed on Jan. 18, 2021.

(51) Int. Cl.
*H04L 5/00*        (2006.01)

(52) U.S. Cl.
CPC .......... *H04L 5/0051* (2013.01); *H04L 5/0098* (2013.01)

(58) Field of Classification Search
CPC ............................ H04L 5/0051; H04L 5/0098
See application file for complete search history.

(56) References Cited

U.S. PATENT DOCUMENTS

| | | | |
|---|---|---|---|
| 2020/0059338 A1* | 2/2020 | Joseph | H04W 72/1273 |
| 2020/0252241 A1 | 8/2020 | Park et al. | |
| 2020/0404593 A1 | 12/2020 | Yao et al. | |

(Continued)

FOREIGN PATENT DOCUMENTS

| | | | | |
|---|---|---|---|---|
| EP | 4266798 A1 * | 10/2023 | | H04L 5/0051 |

OTHER PUBLICATIONS

PCT International Search Report issued for International application No. PCT/IB2022/050402—Apr. 19, 2022.

(Continued)

*Primary Examiner* — Derrick V Rose
(74) *Attorney, Agent, or Firm* — Baker Botts L.L.P.

(57) ABSTRACT

According to certain embodiments, a method performed by a wireless device comprises receiving sounding reference signal (SRS) configuration information from a network node. The SRS configuration information indicates a configuration associated with one or more SRS resources. At least a portion of the SRS configuration information is received in one or more Medium Access Control-Control Element (MAC-CE) messages. The method further comprises configuring the one or more SRS resources based at least in part on the SRS configuration information.

26 Claims, 31 Drawing Sheets

(56) References Cited

U.S. PATENT DOCUMENTS

| 2021/0022006 | A1* | 1/2021 | Sun | H04W 72/23 |
| 2021/0105116 | A1* | 4/2021 | Manolakos | H04B 7/0604 |
| 2023/0344590 | A1* | 10/2023 | Manolakos | H04L 5/0051 |
| 2024/0007260 | A1* | 1/2024 | Wang | H04L 5/0051 |
| 2024/0014971 | A1* | 1/2024 | Zheng | H04L 5/0048 |

OTHER PUBLICATIONS

PCT Written Opinion of the International Searching Authority issued for International application No. PCT/IB2022/050402—Apr. 19, 2022.

* cited by examiner

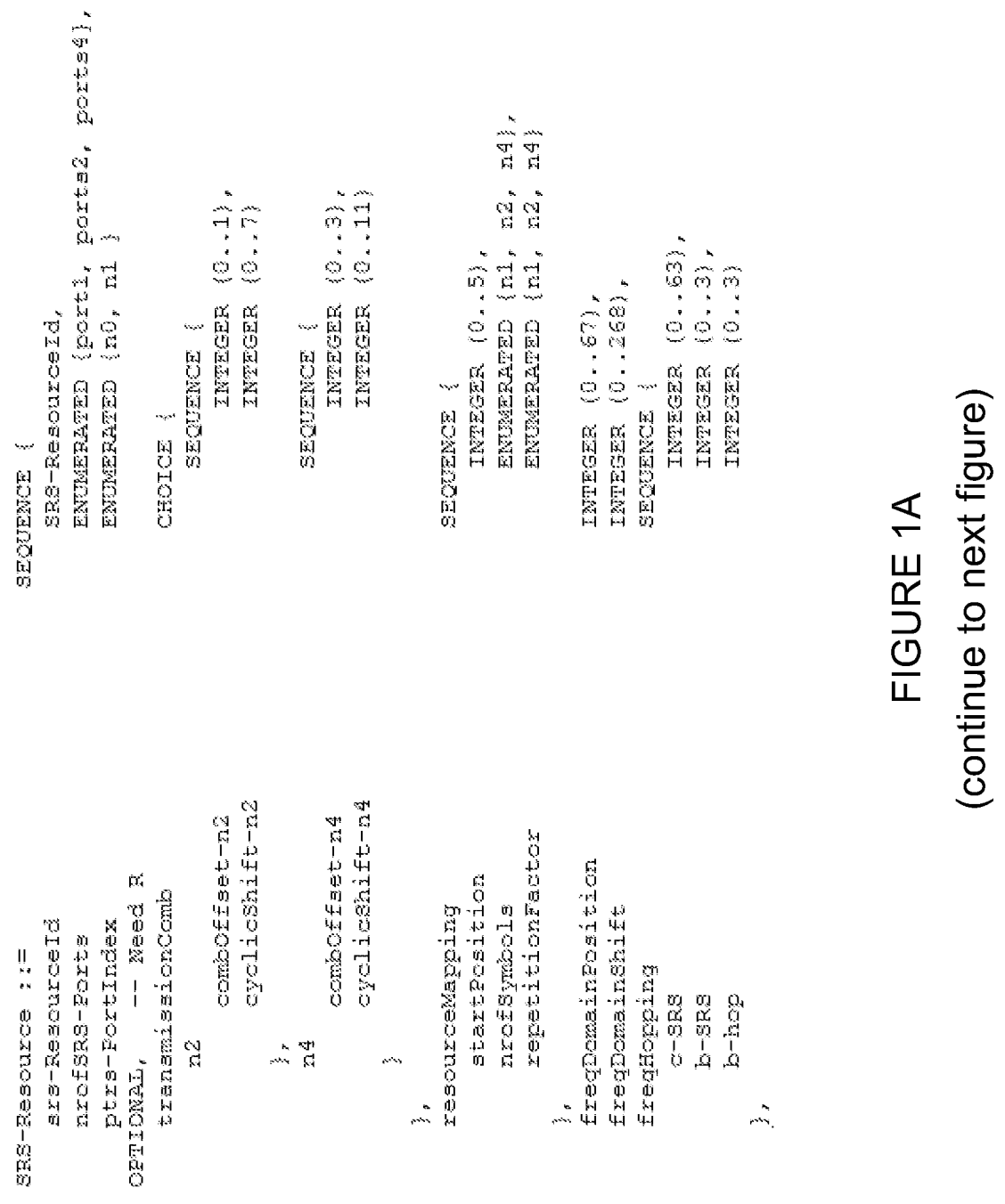

```
SRS-Resource ::=
    srs-ResourceId
    nrofSRS-Ports
    ptrs-PortIndex
OPTIONAL,   -- Need R
    transmissionComb
        n2
            combOffset-n2
            cyclicShift-n2
        },
        n4
            combOffset-n4
            cyclicShift-n4
        }
    },
    resourceMapping
        startPosition
        nrofSymbols
        repetitionFactor
    },
    freqDomainPosition
    freqDomainShift
    freqHopping
        c-SRS
        b-SRS
        b-hop
    },
```

```
SEQUENCE {
    SRS-ResourceId,
    ENUMERATED {port1, ports2, ports4},
    ENUMERATED {n0, n1 }

CHOICE {
        SEQUENCE {
            INTEGER (0..1),
            INTEGER (0..7)
        },
        SEQUENCE {
            INTEGER (0..3),
            INTEGER (0..11)
        }
    },

SEQUENCE {
        INTEGER (0..5),
        ENUMERATED {n1, n2, n4},
        ENUMERATED {n1, n2, n4}
    },

INTEGER (0..67),
    INTEGER (0..268),
    SEQUENCE {
        INTEGER (0..63),
        INTEGER (0..3),
        INTEGER (0..3)
```

FIGURE 1A
(continue to next figure)

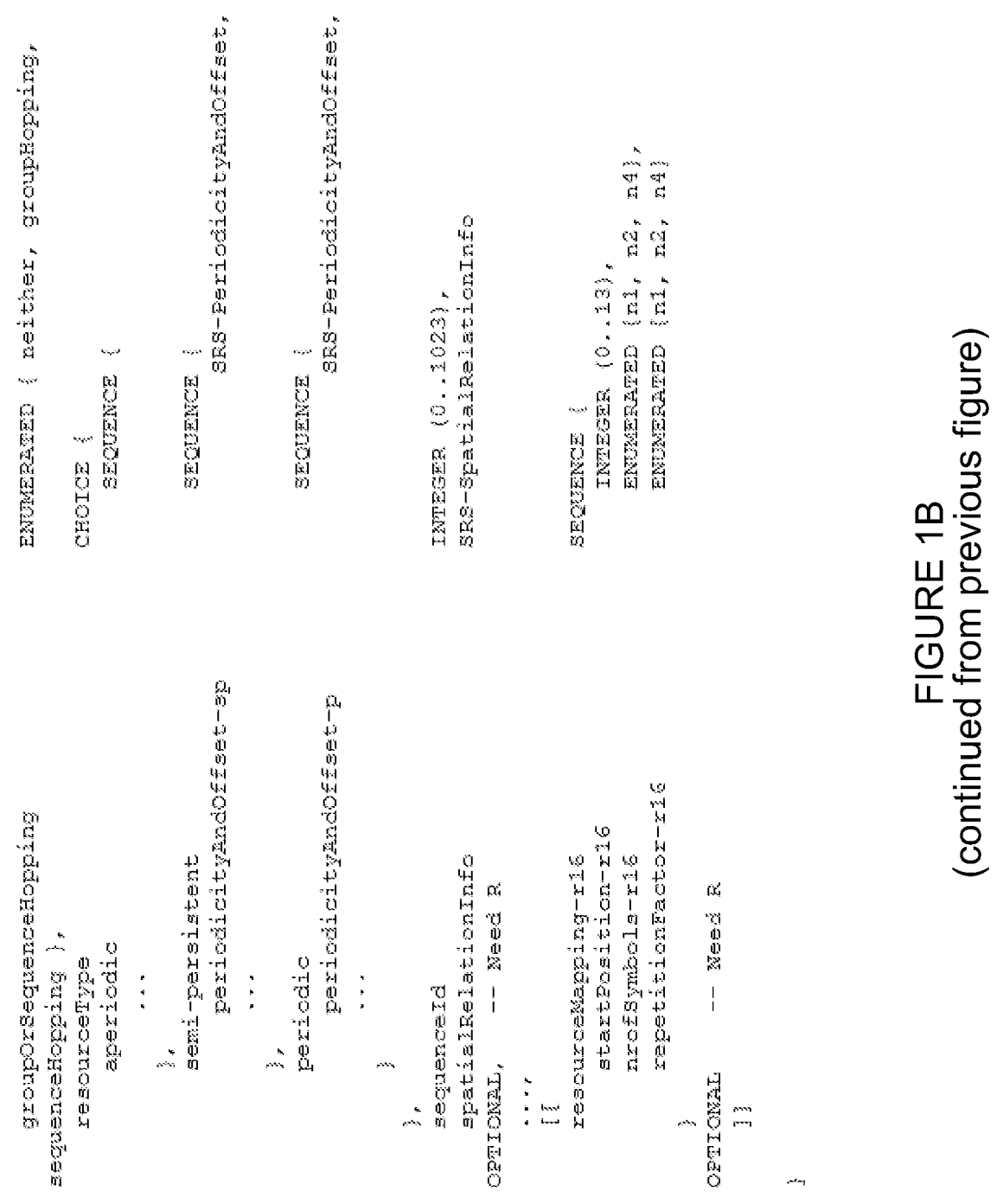

```
            groupOrSequenceHopping          ENUMERATED ( neither, groupHopping,
        sequenceHopping ),
            resourceType                     CHOICE {
                aperiodic                        SEQUENCE {
                    ...
                },
                semi-persistent                  SEQUENCE {
                    periodicityAndOffset-sp          SRS-PeriodicityAndOffset,
                    ...
                },
                periodic                         SEQUENCE {
                    periodicityAndOffset-p           SRS-PeriodicityAndOffset,
                    ...
                }
            },
            sequenceId                       INTEGER (0..1023),
            spatialRelationInfo              SRS-SpatialRelationInfo
        OPTIONAL,    -- Need R
            ...,
            [[
            resourceMapping-r16              SEQUENCE {
                startPosition-r16                INTEGER (0..13),
                nrofSymbols-r16                  ENUMERATED (n1, n2, n4),
                repetitionFactor-r16             ENUMERATED (n1, n2, n4)}
        OPTIONAL    -- Need R
            ]]
        }
```

FIGURE 1B
(continued from previous figure)

```
SRS-ResourceSet ::=               SEQUENCE {
    srs-ResourceSetId                 SRS-ResourceSetId,
    srs-ResourceIdList                SEQUENCE (SIZE(1..maxNrofSRS-ResourcesPerSet)) OF
                                      SRS-ResourceId     OPTIONAL, -- Cond Setup
    resourceType                      CHOICE {
        aperiodic                     SEQUENCE {
            aperiodicSRS-ResourceTrigger  INTEGER (1..maxNrofSRS-TriggerStates-1),
            csi-RS                        NZP-CSI-RS-ResourceId
                                          OPTIONAL, -- Cond NonCodebook
            slotOffset                    INTEGER (1..32)
                                          OPTIONAL, -- Need S
            ...,
            [[
            aperiodicSRS-ResourceTriggerList  SEQUENCE (SIZE(1..maxNrofSRS-
                                              TriggerStates-2))
                                              OF INTEGER (1..maxNrofSRS-
                                              TriggerStates-1) OPTIONAL -- Need M
            ]]
        },
        semi-persistent               SEQUENCE {
            associatedCSI-RS              NZP-CSI-RS-ResourceId
                                          OPTIONAL, -- Cond NonCodebook
            ...
        },
        periodic                      SEQUENCE {
            associatedCSI-RS              NZP-CSI-RS-ResourceId
                                          OPTIONAL, -- Cond NonCodebook
            ...
        }
    },
    usage                             ENUMERATED {beamManagement, codebook, nonCodebook,
                                      antennaSwitching},
    alpha                             Alpha
                                      OPTIONAL, -- Need S
    p0                                INTEGER (-202..24)
                                      OPTIONAL, -- Cond Setup
    pathlossReferenceRS               PathlossReferenceRS-Config
                                      OPTIONAL, -- Need M
    srs-PowerControlAdjustmentStates  ENUMERATED { sameAsTci2, separateClosedLoop}
                                      OPTIONAL, -- Need S
    ...,
    [[
    pathlossReferenceRSList-r16       SetupRelease { PathlossReferenceRSList-r16}
                                      OPTIONAL -- Need M
    ]]
}
```

FIGURE 4

| supportedSRS-TxPortSwitch | supportedSRS-TxPortSwitch-v1610 |
|---|---|
| t1r2 | t1r1-t1r2 |
| t1r4 | t1r1-t1r2-t1r4 |
| t2r4 | t1r1-t1r2-t2r2-t2r4 |
| t2r2 | t1r1-t2r2 |
| t4r4 | t1r1-t2r2-t4r4 |
| t1r4-t2r4 | t1r1-t1r2-t2r2-t1r4-t2r4 |

FIGURE 7

```
SRS-Resource ::=        SEQUENCE {
    srs-ResourceId          SRS-ResourceId,
    activationStatus-r17    Boolean
    nrofSRS-Ports           ENUMERATED {port1, ports2, ports4},
    ptrs-PortIndex          ENUMERATED {n0, n1 }
OPTIONAL, -- Need R
    transmissionComb        CHOICE {
        n2                      SEQUENCE {
            combOffset-n2           INTEGER (0..1),
            cyclicShift-n2          INTEGER (0..7)
        },
        n4                      SEQUENCE {
            combOffset-n4           INTEGER (0..3),
            cyclicShift-n4          INTEGER (0..11)
        }
    },
    resourceMapping         SEQUENCE {
        startPosition           INTEGER (0..5),
        nrofSymbols             ENUMERATED {n1, n2, n4},
        repetitionFactor        ENUMERATED {n1, n2, n4}
    },
    freqDomainPosition      INTEGER (0..67),
    freqDomainShift         INTEGER (0..268),
    freqHopping             SEQUENCE {
        c-SRS                   INTEGER (0..63),
        b-SRS                   INTEGER (0..3),
        b-hop                   INTEGER (0..3)
    },
    groupOrSequenceHopping  ENUMERATED { neither, groupHopping, sequenceHopping },
    resourceType            CHOICE {
        aperiodic               SEQUENCE {
            ...
        },
        semi-persistent         SEQUENCE {
            periodicityAndOffset-sp SRS-PeriodicityAndOffset,
            ...
        },
        periodic                SEQUENCE {
            periodicityAndOffset-p  SRS-PeriodicityAndOffset,
            ...
        }
    },
    sequenceId              INTEGER (0..1023),
    spatialRelationInfo     SRS-SpatialRelationInfo
OPTIONAL, -- Need R
    ...
}
```

FIGURE 8

| | | | | | | | | |
|---|---|---|---|---|---|---|---|---|
| R | R | R | R | R | | | | Oct 1 |
| | A/D | A/D | A/D | A/D | | | | Oct 2 |
| Serving Cell ID (5 bits) | SRS Resource ID (6 bits) | SRS Resource ID (6 bits) | SRS Resource ID (6 bits) | SRS Resource ID (6 bits) | | | | Oct 3 |
| BWP ID (2 bits) | | | | | | | | .... |
| | | | | | | | | Oct M |

FIGURE 9

| R | Serving Cell ID | | | | | BWP ID | | Octet |
|---|---|---|---|---|---|---|---|---|
| $S_7$ | $S_6$ | $S_5$ | $S_4$ | $S_3$ | $S_2$ | $S_1$ | $S_0$ | Oct 1 |
| $S_{15}$ | $S_{14}$ | $S_{13}$ | $S_{12}$ | $S_{11}$ | $S_{10}$ | $S_9$ | $S_8$ | Oct 2 |
| $S_{23}$ | $S_{22}$ | $S_{21}$ | $S_{20}$ | $S_{19}$ | $S_{18}$ | $S_{17}$ | $S_{16}$ | Oct 3 |
| | | | | | | | | ⋮ |
| $S_{(M-2)\times8+7}$ | $S_{(M-2)\times8+6}$ | $S_{(M-2)\times8+5}$ | $S_{(M-2)\times8+4}$ | $S_{(M-2)\times8+3}$ | $S_{(M-2)\times8+2}$ | $S_{(M-2)\times8+1}$ | $S_{(M-2)\times8}$ | Oct M |

FIGURE 10

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF SRS-ResourceId   OPTIONAL, --
    srs-ResourceActivationStatus  SEQUENCE (SIZE(1.. maxNrofSRS-ResourcesPerSet)) OF A/D status
    resourceType                CHOICE {
        aperiodic                   SEQUENCE {
            aperiodicSRS-ResourceTrigger    INTEGER (1..maxNrofSRS-TriggerStates-1),
            csi-RS                          NZP-CSI-RS-ResourceId    OPTIONAL, --- Cond
            ...,
            slotOffset                      INTEGER (1..32)          OPTIONAL, --- Need S
            [[
            aperiodicSRS-ResourceTriggerList    SEQUENCE (SIZE(1..maxNrofSRS-TriggerStates-2))
                                                OF INTEGER (1..maxNrofSRS-TriggerStates-1)   OPTIONAL, --- Need M
            ]]
        },
        semi-persistent             SEQUENCE {
            associatedCSI-RS                NZP-CSI-RS-ResourceId    OPTIONAL, --- Cond
            ...,
        },
        periodic                    SEQUENCE {
            associatedCSI-RS                NZP-CSI-RS-ResourceId    OPTIONAL, --- Cond
            ...
        }
    },
    usage                       ENUMERATED {beamManagement, codebook, nonCodebook, antennaSwitching},
    alpha                       Alpha                        OPTIONAL, --- Need S
    p0                          INTEGER (-202..24)           OPTIONAL, --- Cond Setup
    pathlossReferenceRS         PathlossReferenceRS-Config   OPTIONAL, --- Need M
    srs-PowerControlAdjustmentStates  ENUMERATED { sameAsFci2, separateClosedLoop}   OPTIONAL, --- Need S
    ...,
}
```

FIGURE 11

| | | | Oct 1 |
|---|---|---|---|
| R | Serving Cell ID (5 bits) | BWP ID (2 bits) | Oct 1 |
| R | SRS Resource set ID | | Oct 2 |
| A/D | SRS Resource ID | | Oct 3 |
| A/D | SRS Resource ID | | ... |
| A/D | SRS Resource ID | | Oct M |

FIGURE 12

| Serving Cell ID | | | | | | | | BWP ID | | |
|---|---|---|---|---|---|---|---|---|---|---|
| R | R | | | | | | | | | |
| | | SRS Resource set ID | | | | | | | | |
| | $S_7$ | $S_6$ | $S_5$ | $S_4$ | $S_3$ | | $S_2$ | $S_1$ | $S_0$ | Oct 1 |
| | $S_{15}$ | $S_{14}$ | $S_{13}$ | $S_{12}$ | $S_{11}$ | | $S_{10}$ | $S_9$ | $S_8$ | Oct 2 |
| | $S_{(M-3)\times8+7}$ | $S_{(M-3)\times8+6}$ | $S_{(M-3)\times8+5}$ | $S_{(M-3)\times8+4}$ | $S_{(M-3)\times8+3}$ | | $S_{(M-3)\times8+2}$ | $S_{(M-3)\times8+1}$ | $S_{(M-3)\times8}$ | Oct 3 |
| | | | | | | | | | | ... |
| | | | | | | | | | | Oct M |

FIGURE 13

```
SRS-Resource ::=
    srs-ResourceId            SRS-ResourceId,
    nrofSRS-Ports             ENUMERATED {port1, ports2, ports4},
    CandidateListOfNumberOfSrsPorts-r17   Sequence{ 1 .. maxNumberOfSRSPorts} of numberOfsrsPorts ptrs-PortIndex            ENUMERATED {n0, n1 }           OPTIONAL,      -- Need R
    transmissionComb          CHOICE {
        n2                        SEQUENCE {
            combOffset-n2             INTEGER (0..1),
            cyclicShift-n2            INTEGER (0..7)
        },
        n4                        SEQUENCE {
            combOffset-n4             INTEGER (0..3),
            cyclicShift-n4            INTEGER (0..11)
        }
    },
    resourceMapping           SEQUENCE {
        startPosition             INTEGER (0..5),
        nrofSymbols               ENUMERATED {n1, n2, n4},
        repetitionFactor          ENUMERATED {n1, n2, n4}
    },
    freqDomainPosition        INTEGER (0..67),
    freqDomainShift           INTEGER (0..268),
    freqHopping               SEQUENCE {
        c-SRS                     INTEGER (0..63),
        b-SRS                     INTEGER (0..3),
        b-hop                     INTEGER (0..3)
    },
    groupOrSequenceHopping    ENUMERATED { neither, groupHopping, sequenceHopping },
    resourceType              CHOICE {
        aperiodic                 SEQUENCE {
            ...
        },
        semi-persistent           SEQUENCE {
            periodicityAndOffset-sp   SRS-PeriodicityAndOffset,
            ...
        },
        periodic                  SEQUENCE {
            periodicityAndOffset-p    SRS-PeriodicityAndOffset,
            ...
        }
    },
    sequenceId                INTEGER (0..1023),
    spatialRelationInfo       SRS-SpatialRelationInfo       OPTIONAL,      -- Need R
    ...,
```

FIGURE 14

| | | | |
|---|---|---|---|
| R | Serving Cell ID (5 bits) | BWP ID (2 bits) | Oct 1 |
| Number of SRS ports (2 bits) | SRS Resource ID (6 bits) | | Oct 2 |
| Number of SRS ports (2 bits) | SRS Resource ID (6 bits) | | Oct 3 |
| Number of SRS ports (2 bits) | SRS Resource ID (6 bits) | | ... |
| Number of SRS ports (2 bits) | SRS Resource ID (6 bits) | | Oct M |

FIGURE 15

```
SRS-ResourceSet ::=          SEQUENCE {
    srs-ResourceSetId              SRS-ResourceSetId,
    srs-ResourceIdList             SEQUENCE (SIZE(1..maxNrofSRS-ResourcesPerSet)) OF SRS-ResourceId   OPTIONAL,  --
    srs-numberOfPortsPerResourcePerSet-r17   INTEGER (1..4)
    resourceType                   CHOICE {
        aperiodic                      SEQUENCE {
            aperiodicSRS-ResourceTrigger   INTEGER (1..maxNrofSRS-TriggerStates-1),
            csi-RS                         NZP-CSI-RS-ResourceId            OPTIONAL,  -- Cond
                                                                           OPTIONAL,  -- Need S
    NonCodebook
            slotOffset                     INTEGER (1..32)                             -- Need S
            ...,
            [[
            aperiodicSRS-ResourceTriggerList   SEQUENCE (SIZE(1..maxNrofSRS-TriggerStates-2))
                                                   OF INTEGER (1..maxNrofSRS-TriggerStates-1)  OPTIONAL,  -- Need M
            ]]
        },
        semi-persistent                SEQUENCE {
            associatedCSI-RS               NZP-CSI-RS-ResourceId           OPTIONAL,  -- Cond
    NonCodebook
            ...,
        },
        periodic                       SEQUENCE {
            associatedCSI-RS               NZP-CSI-RS-ResourceId           OPTIONAL,  -- Cond
    NonCodebook
            ...,
        }
    },
    usage                          ENUMERATED {beamManagement, codebook, nonCodebook, antennaSwitching},
    alpha                          Alpha                                  OPTIONAL,  -- Need S
    p0                             INTEGER (-202..24)                     OPTIONAL,  -- Cond Setup
    pathlossReferenceRS            PathlossReferenceRS-Config             OPTIONAL,  -- Need M
    srs-PowerControlAdjustmentStates   ENUMERATED { sameAsFci2, separateClosedLoop}  OPTIONAL,  -- Need S
    ...,
}
```

FIGURE 16

| | | Oct 1 |
|---|---|---|
| R | Serving Cell ID (5 bits) | BWP ID (2 bits) |
| R | Number SRS ports (2 bits) | SRS Resource set ID (4 bits) |
| R | Number SRS ports (2 bits) | SRS Resource set ID (4 bits) |
| R | Number SRS ports (2 bits) | SRS Resource set ID (4 bits) |
| R | Number SRS ports (2 bits) | SRS Resource set ID (4 bits) |

Oct 1
Oct 2
Oct 3
⋮
Oct M

FIGURE 17

| R | | Serving cell ID (5bits) | BWP ID bits( 2) | OCT 1 |
|---|---|---|---|---|
| Number of ports for first SRS resource in set (2 bits) | | Number of ports for second SRS resource in set (2 bits) | SRS set ID 4 bits | OCT 2 |
| Number of ports for third SRS resource in set (2 bits) | Number of ports for fourth SRS resource in set (2 bits) | Number of ports for fifth SRS resource in set (2 bits) | Number of ports for sixth SRS resource in set (2 bits) | OCT 3 |
| | … | … | … | OCT M-1 |
| Number of ports for fourth last SRS resource in set (2 bits) | Number of ports for third last SRS resource in set (2 bits) | Number of ports for second last SRS resource in set (2 bits) | Number of ports for last SRS resource in set (2 bits) | OCT M |

FIGURE 18

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

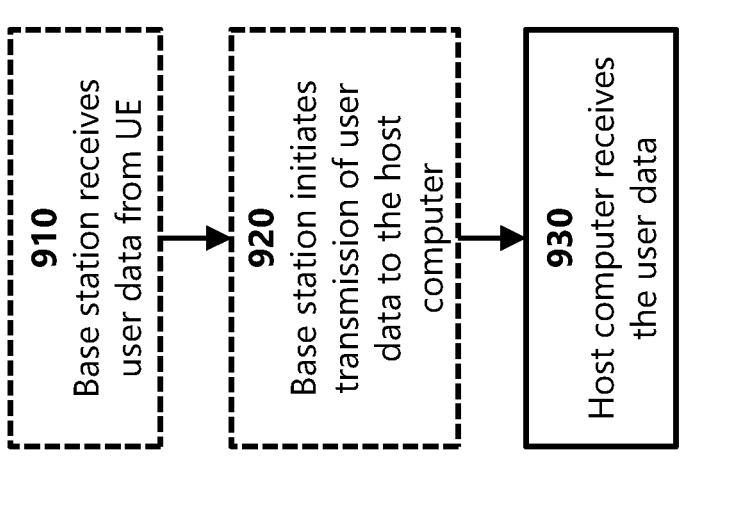

| 910 Base station receives user data from UE | 920 Base station initiates transmission of user data to the host computer | 930 Host computer receives the user data |

FIGURE 27

| 811 UE executes client application | 821 UE executes client application |

| 810 UE receives input data provided at host computer | 820 UE provides user data | 830 UE initiates transmission of the user data to the host computer | 840 Host computer receives user data transmitted from the UE |

FIGURE 26

2802
receiving sounding reference signal (SRS) configuration information from a network node, the SRS configuration information indicating a configuration associated with one or more SRS resources

2804
configuring the one or more SRS resources based at least in part on the SRS configuration information

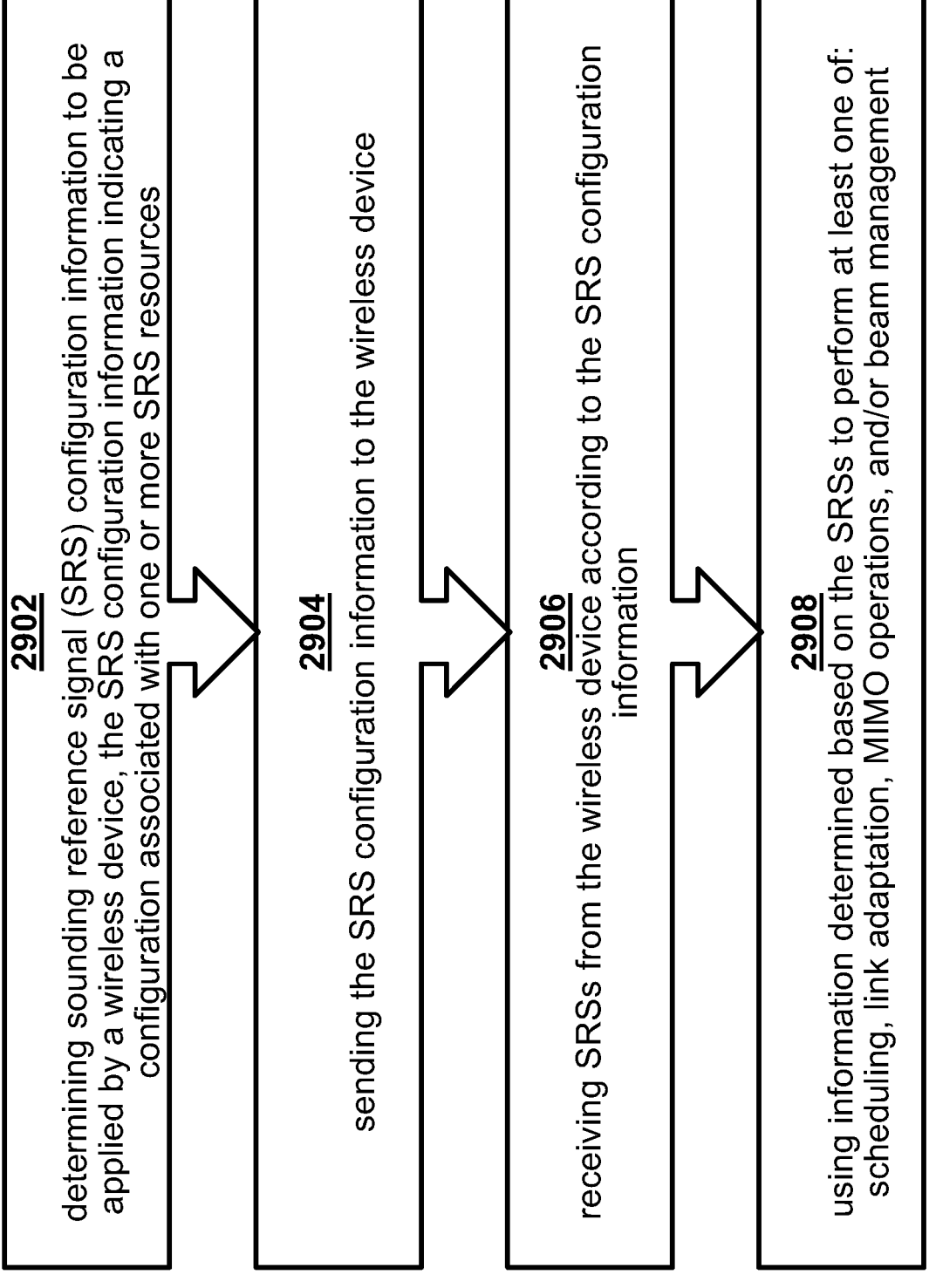

2902 determining sounding reference signal (SRS) configuration information to be applied by a wireless device, the SRS configuration information indicating a configuration associated with one or more SRS resources

2904 sending the SRS configuration information to the wireless device

2906 receiving SRSs from the wireless device according to the SRS configuration information

2908 using information determined based on the SRSs to perform at least one of: scheduling, link adaptation, MIMO operations, and/or beam management

Figure 29

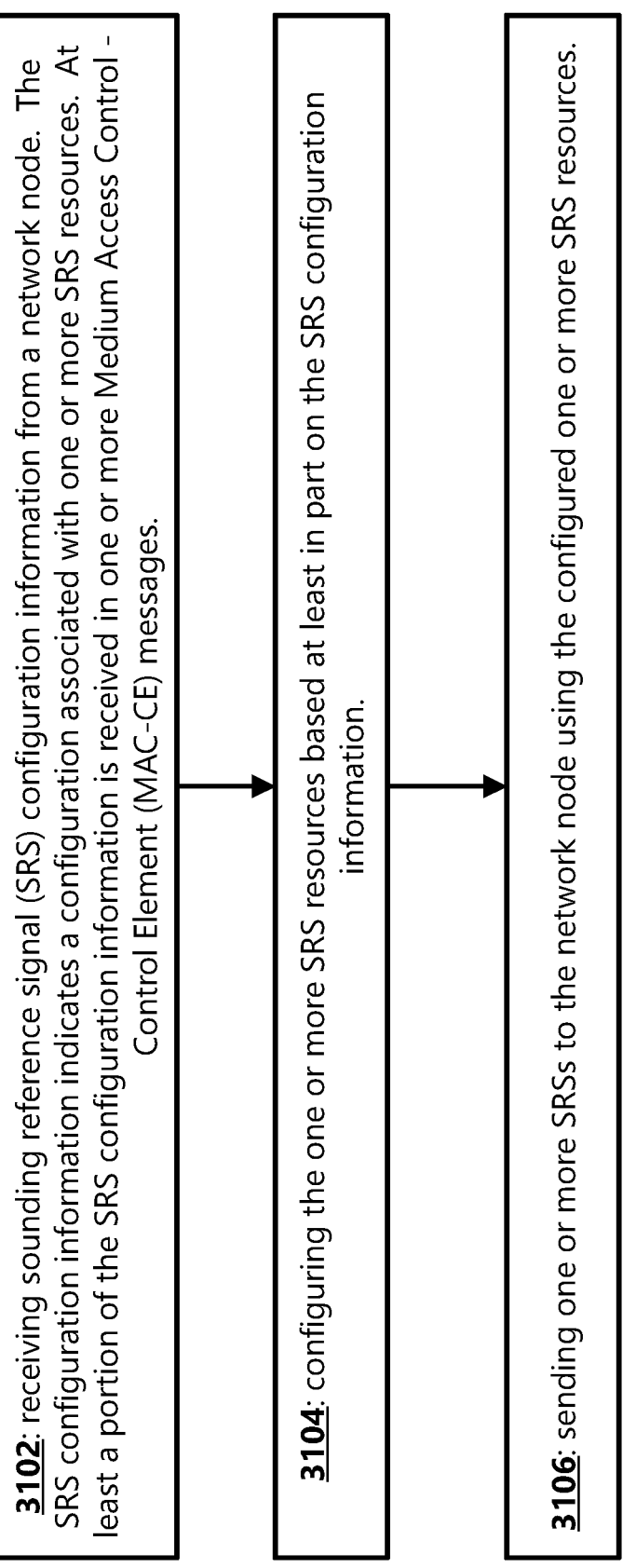

3102: receiving sounding reference signal (SRS) configuration information from a network node. The SRS configuration information indicates a configuration associated with one or more SRS resources. At least a portion of the SRS configuration information is received in one or more Medium Access Control - Control Element (MAC-CE) messages.

3104: configuring the one or more SRS resources based at least in part on the SRS configuration information.

3106: sending one or more SRSs to the network node using the configured one or more SRS resources.

Figure 31

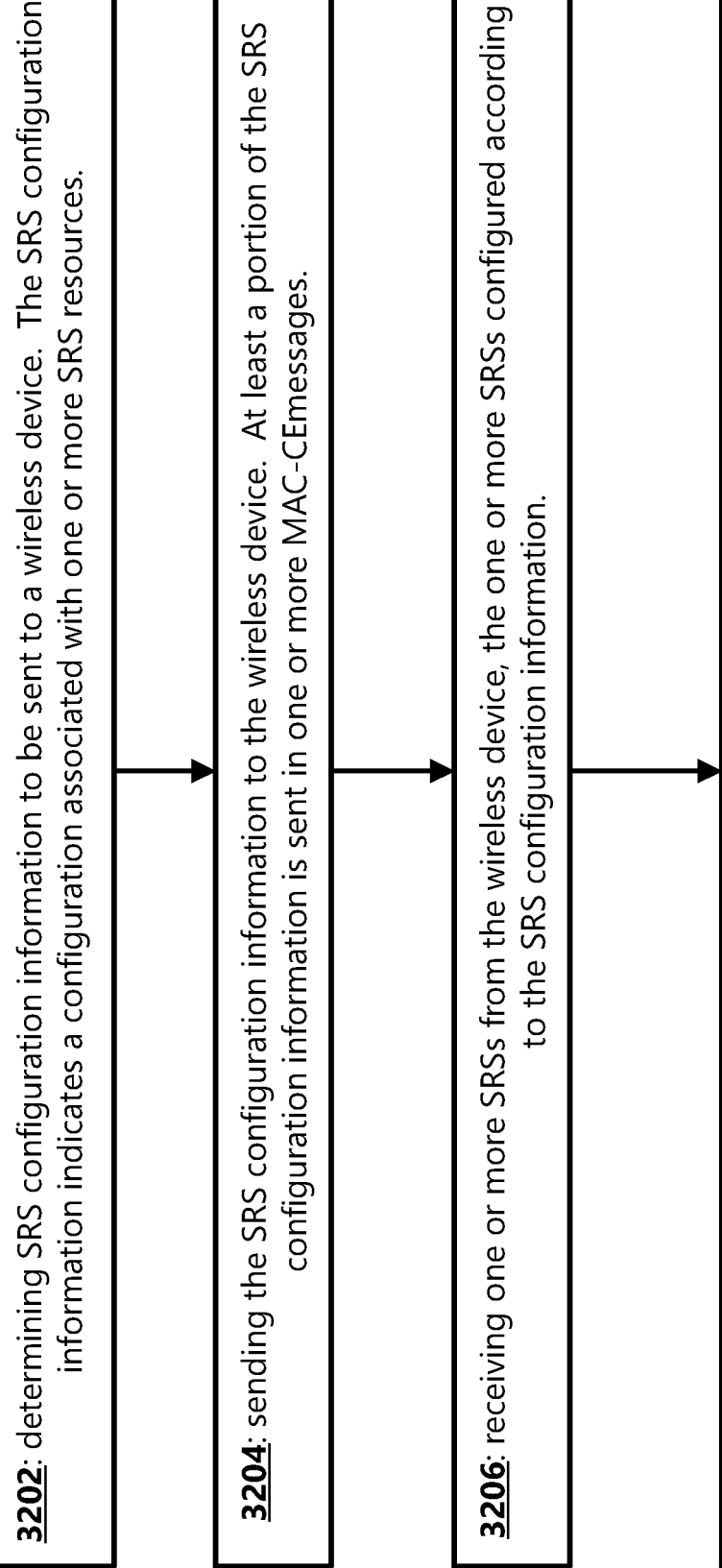

3202: determining SRS configuration information to be sent to a wireless device. The SRS configuration information indicates a configuration associated with one or more SRS resources.

3204: sending the SRS configuration information to the wireless device. At least a portion of the SRS configuration information is sent in one or more MAC-CEmessages.

3206: receiving one or more SRSs from the wireless device, the one or more SRSs configured according to the SRS configuration information.

3208: using information determined based on the SRSs to perform at least one of: scheduling, link adaptation, MIMO operations, and/or beam management.

Figure 32

INDICATING A SUBSET OF TX RX ANTENNAS FOR SRS ANTENNA SWITCHING VIA MAC-CE

PRIORITY

This nonprovisional application is a U.S. National Stage Filing under 35 U.S.C. § 371 of International Patent Application Serial No. PCT/IB2022/050402 filed Jan. 18, 2022 and entitled "INDICATING A SUBSET OF TX RX ANTENNAS FOR SRS ANTENNA SWITCHING VIA MAC-CE" which claims priority to U.S. Provisional Patent Application No. 63/138,703 filed Jan. 18, 2021, both of which are hereby incorporated by reference in their entirety.

TECHNICAL FIELD

Certain embodiments relate, in general, to wireless communications, and, more particularly, to indicating a subset of transmitter (TX)/receiver (RX) antennas for sounding reference signal (SRS) antenna switching via Medium Access Control-control element (MAC-CE).

BACKGROUND

The SRS is used in third generation partnership project (3GPP) systems Long Term Evolution (LTE) and New Radio (NR) to estimate the channel in the uplink (UL). The application for the SRS is mainly to provide a reference signal to evaluate the channel quality, for example, in order to derive the appropriate transmission/reception beams or to perform link adaptation (i.e., setting the rank, the modulation and coding scheme (MCS), and the multiple-input multiple-output (MIMO) precoder) for physical uplink shared channel (PUSCH) transmission. The signal is functionality-wise similar to the downlink (DL) channel-state information reference signal (CSI-RS), which provides similar beam management and link adaptation functions in the DL. SRS can be used instead of (or in combination with) CSI-RS to acquire DL CSI (by means of uplink-downlink channel reciprocity) for enabling physical downlink shared channel (PDSCH) link adaptation.

In LTE and NR, the SRS is configured via radio resource control (RRC), and some parts of the configuration can be updated (for reduced latency) by medium access control (MAC) control element (CE) signaling. The configuration includes the SRS resource allocation (the physical mapping and sequence to use) as well as the time (aperiodic/semi-persistent/periodic) behavior. For aperiodic SRS transmission, the RRC configuration does not activate an SRS transmission from the user equipment (UE), but instead a dynamic activation trigger is transmitted via the physical downlink control channel (PDCCH)'s downlink control information (DCI) in the DL from the gNodeB (gNB—the radio base station in NR) to order the UE to transmit the SRS once, at a predetermined time.

SRS Configuration

The SRS configuration allows generating an SRS transmission pattern based on an SRS resource configuration grouped into SRS resource sets. Each SRS resource is configured with an abstract syntax notation (ASN) code in RRC, for example, as shown in FIG. 1 (note that FIG. 1 begins at FIG. 1A and continues to FIG. 1B). See also 3GPP Technical Specification (TS) 38.331 version 16.1.0.

To create the SRS resource on the time-frequency grid with the current RRC configuration, each SRS resource is thus configurable with respect to:

The transmission comb (i.e., mapping to every $n^{th}$ subcarrier, where n=2 or n=4), configured by the RRC parameter transmissionComb.

For each SRS resource, a comb offset, configured by the RRC parameter combOffset, is specified (i.e., which of the n combs to use).

A cyclic shift, configured by the RRC parameter cyclicShift, that maps the SRS sequence to the assigned comb, is also specified. The cyclic shift increases the number of SRS resources that can be mapped to a comb, but there is a limit on how many cyclic shifts can be used. The limit depends on the transmission comb being used.

The time-domain position of an SRS resource within a given slot is configured with the RRC parameter resourceMapping.

A time-domain start position for the SRS resource, which is limited to be one of the last 6 symbols in a slot, is configured by the RRC parameter startPosition.

A number of orthogonal frequency-division multiplexing (OFDM) symbols for the SRS resource (that can be set to 1, 2 or 4) is configured by the RRC parameter nrofSymbols.

A repetition factor (that can be set to 1, 2 or 4) configured by the RRC parameter repetitionFactor. When this parameter is larger than 1, the same frequency resources are used multiple times across OFDM symbols, used to improve the coverage as more energy is collected by the receiver. It can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol is 4 resource blocks (RBs).

A schematic description of how an SRS resource is allocated in time and frequency in a given OFDM symbol within a slot is provided in FIG. 2. Note that c-SRS controls the maximum sounding bandwidth, which can be smaller than the maximum transmission bandwidth that the UE supports. For example, the UE may have capability to transmit over 40 MHz bandwidth, but c-SRS is set to a smaller value corresponding to 5 MHz, thereby focusing the available transmit power to a narrowband transmission which improves the SRS coverage.

In NR release 16, an additional RRC parameter called resourceMapping-r16 was introduced. If resourceMapping-r16 is signaled, the UE shall ignore the RRC parameter resourceMapping. The difference between resourceMapping-r16 and resourceMapping is that the SRS resource (for which the number of OFDM symbols and repetition factor is still limited to 4) can start in any of the 14 OFDM symbols (see FIG. 3) within a slot, configured by the RRC parameter startPosition-r16.

The RRC parameter resourceType configures whether the resource is transmitted as periodic, aperiodic (singe transmission triggered by DCI), or semi persistent (same as periodic but the start and stop of the periodic transmission is controlled by MAC CE signaling instead of RRC signaling). The RRC parameter sequenceId specifies how the SRS sequence is initialized and the RRC parameter spatialRelationInfo configures the spatial relation for the SRS beam with respect to a reference signal (RS) which can be either another SRS, synchronization signal block (SSB) or CSI-RS. Hence, if the SRS has a spatial relation to another SRS, then this SRS should be transmitted with the same beam (i.e., spatial transmit filter) as the indicated SRS.

The SRS resource is configured as part of an SRS resource set. Within a set, the following parameters (common to all resources in the set) are configured in RRC:

The associated CSI-RS resource (this configuration is only applicable for non-codebook-based UL transmission) for each of the possible resource types (aperiodic, periodic and semi persistent). For aperiodic SRS, the associated CSI-RS resource is set by the RRC parameter csi-RS. For periodic and semi-persistent SRS, the associated CSI-RS resource is set by the RRC parameter associatedCSI-RS. Note that all resources in a resource set must share the same resource type.

For aperiodic resources, the slot offset is configured by the RRC parameter slotOffset and sets the delay from the PDCCH trigger reception to start of the transmission of the SRS resources measured in slots.

The resource usage, which is configured by the RRC parameter usage sets the constraints and assumption on the resource properties (see 3GPP TS 38.214).

The power-control RRC parameters alpha, p0, pathloss-ReferenceRS (indicating the downlink reference signal (RS) that can be used for path-loss estimation), srs-PowerControlAdjustmentStates, and pathlossReferenceRSList-r16 (for NR release 16), which are used for determining the SRS transmit power.

Each SRS resource set is configured with the ASN code in RRC shown in FIG. 4. See also 3GPP TS 38.331 version 16.1.0.

Hence it can be seen that in terms of resource allocation, the SRS resource set configures usage, power control, aperiodic transmission timing, and DL resource association. The SRS resource configuration controls the time-and-frequency allocation, the periodicity and offset of each resource, the sequence ID for each resource and the spatial-relation information.

Resource Mapping to Antenna Ports

SRS resources can be configured with four different usages: 'beamManagement', 'codebook', 'nonCodebook' or 'antennaSwitching'.

SRS resources in an SRS resource set configured with usage 'beamManagement' are mainly applicable for frequency bands above 6 GHz (i.e., for frequency range 2 (FR2)) and the purpose is to allow the UE to evaluate different UE transmit beams for wideband (e.g. analog) beamforming arrays. The UE will then transmit one SRS resource per wideband beam, and the gNB will perform reference signal received power (RSRP) measurement on each of the transmitted SRS resources and in this way determine a suitable UE transmit beam. The gNB can then inform the UE which transmit beam to use by updating the spatial relation for different UL reference signals (RSs). It is expected that the gNB will configure the UE with one SRS resource set with usage 'beamManagement' for each analog array (panel) that the UE has.

SRS resources in an SRS resource set configured with usage 'codebook' are used to sound the different UE antennas and let the gNB determine suitable precoders, rank and MCS for PUSCH transmission. How each SRS port is mapped to each UE antenna is up to UE implementation, but it is expected that one SRS port will be transmitted per UE antenna, i.e. the SRS port to antenna-port mapping will be an identity matrix.

SRS resources in an SRS resource set configured with usage 'nonCodebook' are used to sound different potential precoders, autonomously determined by the UE. The UE determines a set of precoder candidates based on reciprocity, transmits one SRS resource per candidate precoder, and the gNB can then, by indicating a subset of these SRS resources, select which precoder(s) the UE should use for PUSCH transmission. One UL layer will be transmitted per indicated SRS, hence candidate precoder. How the UE maps the SRS resources to the antenna ports is up to UE implementation and depends on the channel realization.

SRS resources in an SRS resource set configured with usage 'antennaSwitching' are used to sound the channel in the UL so that the gNB can use reciprocity to determine suitable DL precoders. If the UE has the same number of transmit and receive chains, the UE is expected to transmit one SRS port per UE antenna. The mapping from SRS ports to antenna ports is, however, up to the UE to decide and is transparent to the gNB.

SRS Coverage

Uplink coverage for SRS is identified as a bottleneck for NR and a limiting factor for DL reciprocity-based operation. Some measures to improve the coverage of SRS have been adopted in NR, for example repetition of an SRS resource and/or frequency hopping. One example of frequency hopping is illustrated in FIG. 5, where different parts of the frequency band are sounded in different OFDM symbols, which means that the power spectral density (PSD) for the SRS will improve. Here, the illustrated frequency-hopping pattern is set according to Section 6.4 of 3GPP TS 38.211. FIG. 6 illustrates an example of repetition, where one SRS resource is transmitted in four consecutive OFDM symbols, which will increase the processing gain of the SRS.

SRS Antenna Switching

Since it is desirable for the gNB to sound all UE antennas (where sounding an antenna means transmitting an SRS from that antenna, which, in turn, enables the gNB to estimate the channel between said UE antenna and the antennas at the gNB) but costly to equip the UE with many transmit ports, SRS antenna switching was introduced in NR Rel-15, for several different UE architectures for which the number of receive chains is larger than the number of transmit chains. If a UE supports antenna switching, it will report so by means of UE-capability signaling.

The left column of FIG. 7 (from 3GPP TS 38.306) lists SRS antenna-switching capabilities that can be reported from a UE in NR Rel-15. For example, if a UE reports t1r2 in the UE-capability signaling, it means that it has two receive antennas (i.e., two receive chains) but only has the possibility of transmitting from one of those antennas at a time (i.e., one transmit chain) with support for antenna switching. In this case, two single-port SRS resources can be configured to the UE such that it can sound both receive ports using a single transmit port with an antenna switch in between.

Additional UE capabilities were further introduced in NR Rel-16, see right column of FIG. 7, which indicates support for the UE to be configured with SRS resource set(s) with usage 'antennaSwitching' but where only a subset of all UE antennas is sounded. For example, the UE capability t1r1-t1r2 means that the gNB can configure one single-port SRS resource (same as no antenna-switching capability) or two single-port SRS resources (same as for the capability "1t2r" described above) with usage 'antennaSwitching' per SRS resource set. In this case, if the UE is configured with a single SRS resource (no antenna switching) it will only sound only one of its two antennas, which will save UE power consumption at the cost of reduced channel knowledge at the gNB (since the gNB can only estimate the channel between itself and the UE based on one of the two UE antennas).

Throughout this disclosure, each entry of the table in FIG. 7 (or similar tables) is referred to as an antenna switching configuration (ASC). Each ASC is associated with one or several possible SRS configurations (where each SRS configuration typically includes a number of SRS resource sets, a number of SRS resources per SRS resource set, a number of SRS ports per SRS resource, etc.). Hence, if a UE signals the UE capability t1r1-t1r2, it means that the UE supports to be configured both with the ASC t1r1 and the ASC t1r2.

SUMMARY

There currently exist certain challenge(s). For example, as described above, in NR Rel-16 additional support was included enabling a gNB to configure a UE with SRS antenna switching where only a subset of the UE antennas are sounded in each SRS transmission occasion in order to save UE energy consumption and SRS overhead.

One drawback, however, is that RRC signaling is needed to switch between the multiple supported ASC for a UE, which limits the potential of adapting the SRS antenna switching scheme to the current need (since RRC signaling is slow and overhead heavy).

In addition, when configuring a UE to transmit SRS from a subset of the UE antennas by, for example, configuring a four-port UE with 1t2r instead of 1t4r (in case the UE has supports both ASCs and has signaled capability t1r1-t1r2-t1r4), there is no possibility for the gNB to indicate which two out of the four available UE antennas the UE should transmit SRS from, which might have a negative impact on the performance. For example, the antennas selected by the UE may be blocked by the hand of the user holding the mobile handset, which is a problem.

Certain aspects of the present disclosure and their embodiments may provide solutions to these or other challenges.

Certain embodiments introduce an extension of the gNB-to-UE signaling (e.g., MAC-CE signaling) that allows for (semi-static) switching between ASCs for cases in which the UE has reported a capability that supports multiple ASCs.

In the case where the selected ASC implies transmitting SRS from a subset of all antennas, certain embodiments include in signaling (e.g., by MAC CE) from the gNB an indication of which subset of antennas shall be used by the UE.

Note that whether an SRS resource/SRS port is allowed to be activated/de-activated might depend on the UE capability signaling (i.e. which antenna switching configuration(s) (ASC)) the UE supports, and what the specification allows for each supported antenna switching configuration.

There are, proposed herein, various embodiments which address one or more of the issues disclosed herein.

According to certain embodiments, a method performed by a wireless device comprises receiving SRS configuration information from a network node. The SRS configuration information indicates a configuration associated with one or more SRS resources. At least a portion of the SRS configuration information is received in one or more MAC-CE messages. The method comprises configuring the one or more SRS resources based at least in part on the SRS configuration information.

According to certain embodiments, a wireless device comprises power supply circuitry and processing circuitry. The power supply circuitry is configured to supply power to the wireless device. The processing circuitry is configured to receive SRS configuration information from a network node. The SRS configuration information indicates a configuration associated with one or more SRS resources. At least a portion of the SRS configuration information is received in one or more MAC-CE messages. The processing circuitry is configured to configure the one or more SRS resources based at least in part on the SRS configuration information.

In certain embodiments, the wireless device and/or the method performed by the wireless device may include one or more additional features, such as one or more of the following features:

In certain embodiments, the one or more MAC-CE messages comprise one or more SRS resource identifiers and, for each SRS resource identifier, an indication whether to use an SRS resource corresponding to said SRS resource identifier.

In certain embodiments, the SRS configuration information indicates a number of SRS ports configured per each of the one or more SRS resources.

In certain embodiments, the SRS configuration information indicates the configuration according to one or more SRS resource sets. For example, in certain embodiments, each of the indicated SRS resource set(s) comprises at least one of the SRS resources to be configured based on the SRS configuration information.

In certain embodiments, the SRS configuration information comprises one or more SRS resource set identifiers. Each SRS resource set identifier indicates a respective set of the SRS resources to which a portion of the SRS configuration information that is associated with said SRS resource set identifier applies. For example, in certain embodiments, the SRS resource set identifier is associated with a list of SRS resource identifiers corresponding to the one or more SRS resources belonging to said SRS resource set.

In certain embodiments, the SRS configuration information indicates to activate or deactivate one or more of the indicated SRS resources.

In certain embodiments, the SRS configuration information indicates to activate or deactivate one or more of the SRS resource sets. Activating a given SRS resource set comprises activating each SRS resource in said SRS resource set. Deactivating the given SRS resource set comprises deactivating each SRS resource in said SRS resource set.

In certain embodiments, the SRS configuration information indicates to activate or deactivate a given SRS resource with respect to each SRS resource set in which said SRS resource has been configured.

In certain embodiments, the SRS configuration information indicates to activate or deactivate one or more of the SRS resource(s) for a given SRS resource set.

In certain embodiments, the SRS configuration information indicates to change a number of SRS ports for at least one of the one or more SRS resources. For example, in certain embodiments, when the number of SRS ports is reduced, the SRS configuration information further indicates which of the SRS ports should remain configured.

In certain embodiments, the SRS configuration information indicates which antennas of the wireless device are to be sounded.

In certain embodiments, the SRS configuration information indicates to change a number of SRS ports for all of the SRS resources in an SRS resource set.

In certain embodiments, the SRS configuration information indicates to change a number of SRS ports per SRS resource for one SRS resource set.

In certain embodiments, the SRS configuration information indicates an ASC.

In certain embodiments, at least a portion of the SRS configuration information is received in RRC signaling. For example, in certain embodiments, the RRC signaling initializes the SRS configuration information and the one or more MAC CE messages update the SRS configuration information.

Certain embodiments further comprise sending one or more SRSs to the network node, the one or more SRSs sent using the configured one or more SRS resources.

According to certain embodiments, a computer program comprises instructions which when executed on a computer perform any of the steps of any of the above-described methods performed by a wireless device.

According to certain embodiments, a computer program product comprises a computer program, the computer program comprising instructions which when executed on a computer perform any of the steps of any of the above-described methods performed by a wireless device.

According to certain embodiments, a non-transitory computer-readable storage medium or carrier comprises a computer program, the computer program comprising instructions which when executed on a computer perform any of the steps of any of the above-described methods performed by a wireless device.

According to certain embodiments, a method performed by a network node comprises sending SRS configuration information to a wireless device. The SRS configuration information indicates a configuration associated with one or more SRS resources. At least a portion of the SRS configuration information is sent in one or more MAC-CE messages.

According to certain embodiments, a network node comprises power supply circuitry and processing circuitry. The power supply circuitry is configured to supply power to the network node. The processing circuitry is configured to send SRS configuration information to a wireless device. The SRS configuration information indicates a configuration associated with one or more SRS resources. At least a portion of the SRS configuration information is sent in one or more MAC-CE messages.

In certain embodiments, the network node and/or the method performed by the network node may include one or more additional features, such as one or more of the following features:

Certain embodiments further comprise receiving one or more SRSs from the wireless device, the one or more SRSs configured according to the SRS configuration information.

Certain embodiments further comprise using information determined based on the SRSs to perform scheduling, link adaptation, MIMO operations, and/or beam management.

Certain embodiments determine the SRS configuration information to be sent to the wireless device (e.g., prior to sending the SRS configuration information to the wireless device. As an example, in certain embodiments, the SRS configuration information is determined based at least in part on capability information received from the wireless device. The capability information indicates that the wireless device supports multiple antenna switching configurations. In addition, or in the alternative, certain embodiments determine the SRS configuration information based at least in part based on radio conditions, network conditions, and/or wireless device performance.

In certain embodiments, the one or more MAC-CE messages comprise one or more SRS resource identifiers and, for each SRS resource identifier, an indication whether to use an SRS resource corresponding to said SRS resource identifier.

In certain embodiments, the SRS configuration information indicates a number of SRS ports configured per each of the one or more SRS resources.

In certain embodiments, the SRS configuration information indicates the configuration according to one or more SRS resource sets. For example, in certain embodiments, each of the indicated SRS resource set(s) comprises at least one of the SRS resources to be configured based on the SRS configuration information.

In certain embodiments, the SRS configuration information comprises one or more SRS resource set identifiers. Each SRS resource set identifier indicates a respective set of the SRS resources to which a portion of the SRS configuration information that is associated with said SRS resource set identifier applies. For example, in certain embodiments, the SRS resource set identifier is associated with a list of SRS resource identifiers corresponding to the one or more SRS resources belonging to said SRS resource set.

In certain embodiments, the SRS configuration information indicates to activate or deactivate one or more of the indicated SRS resources.

In certain embodiments, the SRS configuration information indicates to activate or deactivate one or more of the SRS resource sets. Activating a given SRS resource set comprises activating each SRS resource in said SRS resource set. Deactivating the given SRS resource set comprises deactivating each SRS resource in said SRS resource set.

In certain embodiments, the SRS configuration information indicates to activate or deactivate a given SRS resource with respect to each SRS resource set in which said SRS resource has been configured.

In certain embodiments, the SRS configuration information indicates to activate or deactivate one or more of the SRS resource(s) for a given SRS resource set.

In certain embodiments, the SRS configuration information indicates to change a number of SRS ports for at least one of the one or more SRS resources. In certain embodiments, the SRS configuration information further indicates which of the SRS ports should remain configured when the number of SRS ports is reduced.

In certain embodiments, the SRS configuration information indicates which antennas of the wireless device are to be sounded.

In certain embodiments, the SRS configuration information indicates to change a number of SRS ports for all of the SRS resources in an SRS resource set.

In certain embodiments, the SRS configuration information indicates to change a number of SRS ports per SRS resource for one SRS resource set.

In certain embodiments, the SRS configuration information indicates an ASC.

Certain embodiments further comprise sending at least a portion of the SRS configuration information in RRC signaling. As an example, in certain embodiments, the RRC signaling initializes the SRS configuration information and the one or more MAC CE messages update the SRS configuration information.

According to certain embodiments, a computer program comprises instructions which when executed on a computer perform any of the steps of any of the above-described methods performed by a network node.

According to certain embodiments, a computer program product comprises a computer program, the computer program comprising instructions which when executed on a computer perform any of the steps of any of the above-described methods performed by a network node.

According to certain embodiments, a non-transitory computer-readable storage medium or carrier comprises a computer program, the computer program comprising instructions which when executed on a computer perform any of the steps of any of the above-described methods performed by a network node.

Certain embodiments may provide one or more of the following technical advantage(s). Certain embodiments enable fast and overhead-efficient adaptation of SRS ASCs and selection of a subset of antennas for SRS transmission.

BRIEF DESCRIPTION OF THE DRAWINGS

For a more complete understanding of the disclosed embodiments and their features and advantages, reference is now made to the following description, taken in conjunction with the accompanying drawings, in which:

FIG. 1 illustrates example configuration information related to an SRS Resource. Note: FIG. 1 begins with FIG. 1A and continues to FIG. 1B.

FIG. 4 illustrates example configuration information related to an SRS Resource set.

FIG. 7 illustrates example SRS antenna-switching capabilities supported by the UE.

FIG. 8 illustrates example configuration information related to an SRS Resource in accordance with certain embodiments.

FIG. 9 illustrates an example MAC-CE message for activating or deactivating one or multiple SRS resources in accordance with certain embodiments.

FIG. 10 illustrates an example of a MAC-CE message containing a variable number of fields (Si) in accordance with certain embodiments.

FIG. 11 illustrates example configuration information related to an SRS Resource set in accordance with certain embodiments.

FIG. 12 illustrates an example MAC-CE message for activating or deactivating one or multiple SRS resource(s) for a given SRS resource set in accordance with certain embodiments.

FIG. 13 illustrates another example of a MAC-CE message in accordance with certain embodiments.

FIG. 14 illustrates example configuration information related to an SRS Resource in accordance with certain embodiments.

FIG. 15 illustrates an example of a MAC-CE message for changing the number of SRS ports for one or multiple SRS resources in accordance with certain embodiments.

FIG. 16 illustrates example configuration information related to an SRS Resource set in accordance with certain embodiments.

FIG. 17 illustrates an example of a MAC-CE message for changing the number of SRS ports for all the SRS resources in an SRS resource set in accordance with certain embodiments.

FIG. 18 illustrates an example of a MAC-CE message for changing the number of SRS ports per SRS resource for one SRS resource set in accordance with certain embodiments.

FIG. 26 illustrates example methods implemented in a communication system including a host computer, a base station and a user equipment in accordance with some embodiments.

FIG. 27 illustrates example methods implemented in a communication system including a host computer, a base station and a user equipment in accordance with some embodiments.

FIG. 29 illustrates an example of a method in accordance with some embodiments.

FIG. 31 illustrates an example of a method performed by a wireless device in accordance with certain embodiments.

FIG. 32 illustrates an example of a method performed by a network node in accordance with certain embodiments.

DETAILED DESCRIPTION

Figure 2:
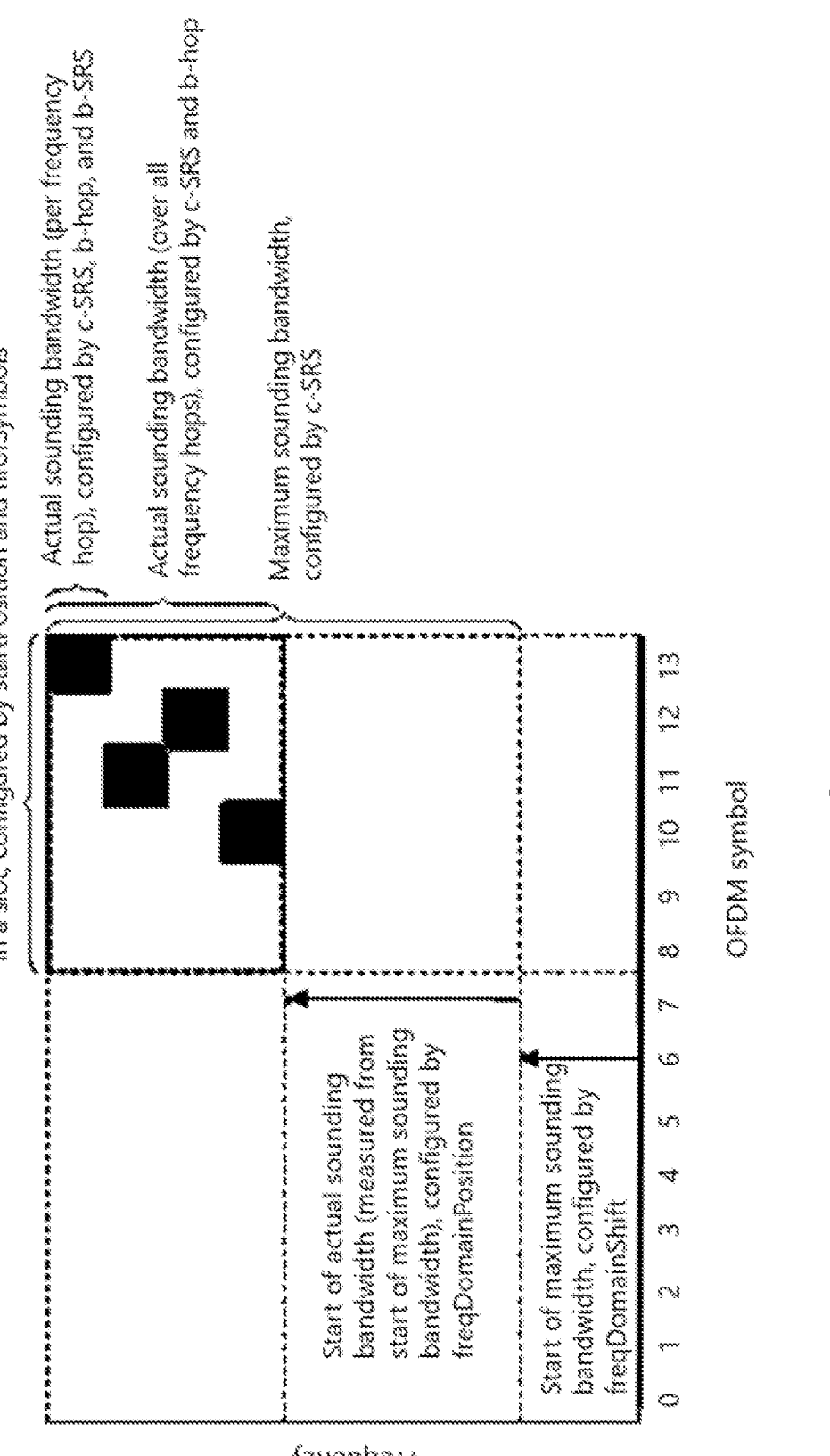
FIG. 2 illustrates an example of how an SRS resource is allocated in time and frequency within a slot if resourceMapping-r16 is not signaled.
Figure 3:
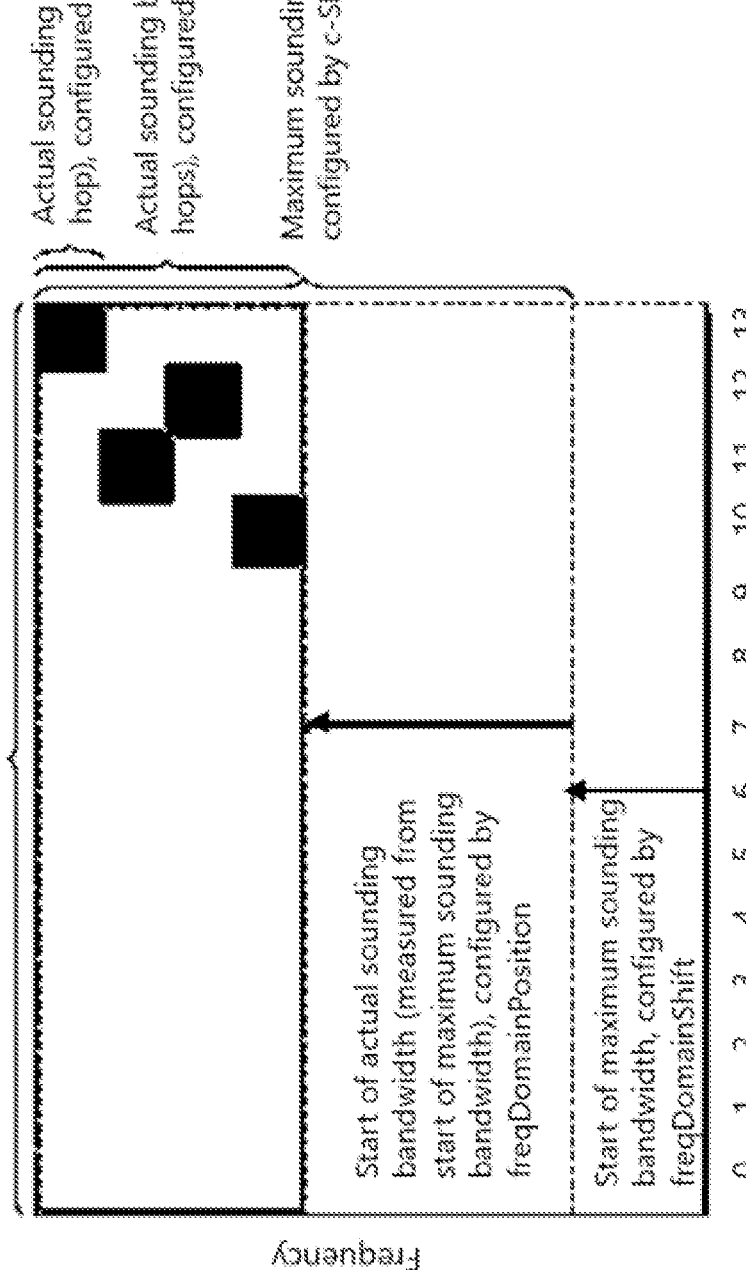
FIG. 3 illustrates an example of how an SRS resource is allocated in time and frequency within a slot if resourceMapping-r16 is signaled.
Figure 5:
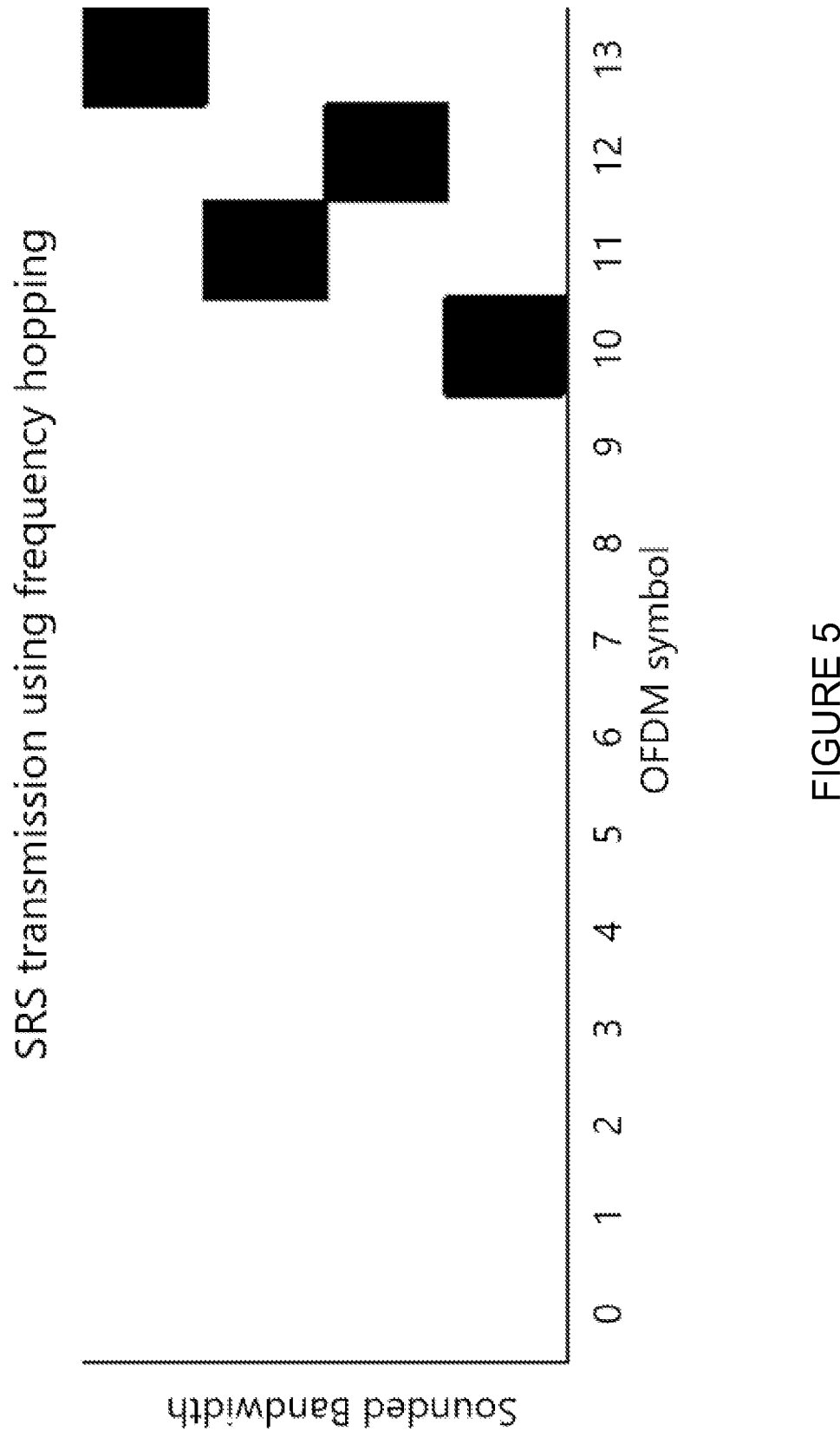
FIG. 5 illustrates an example of SRS transmission using frequency hopping.
Figure 6:
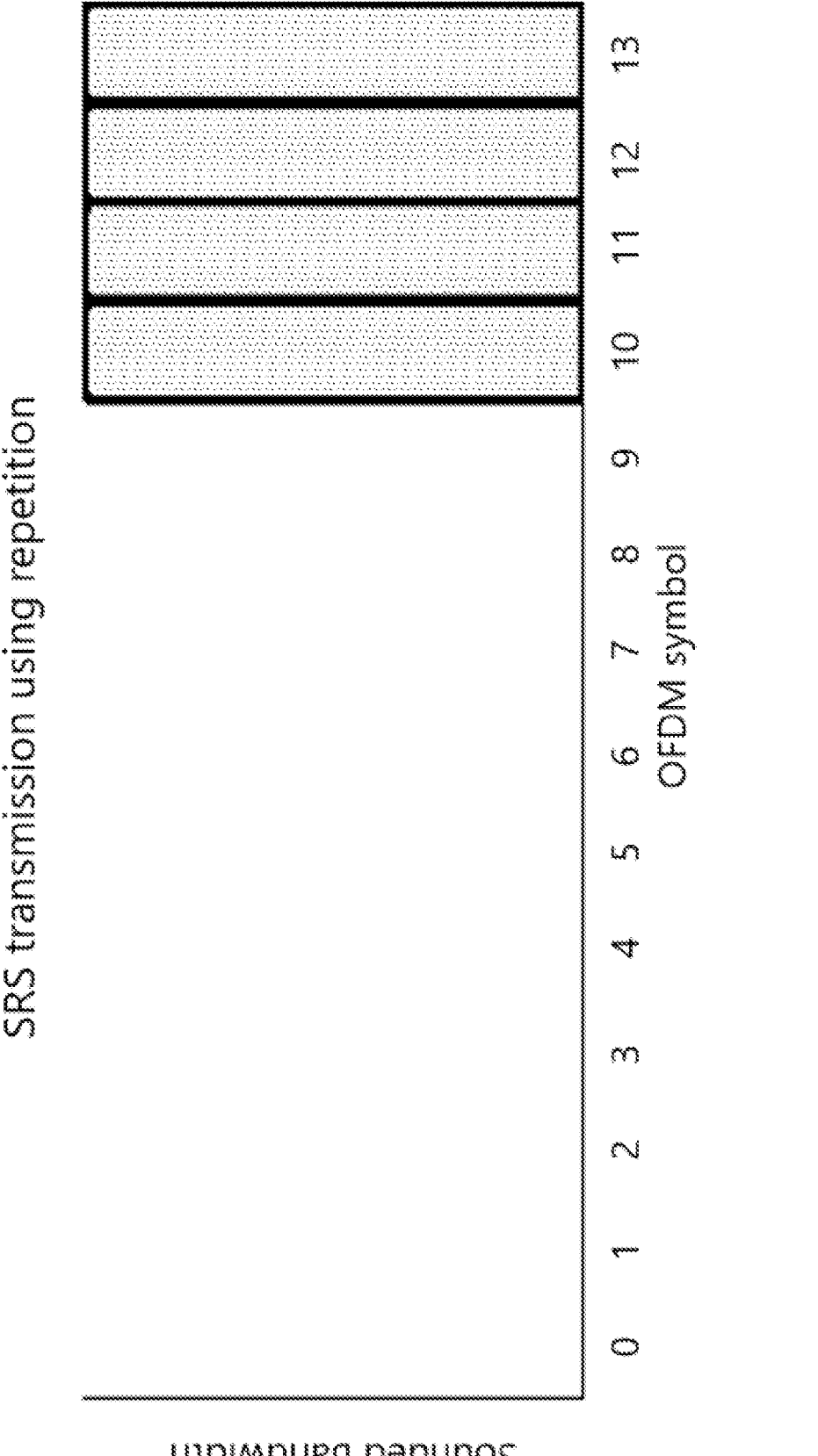
FIG. 6 illustrates an example of SRS transmission using repetition.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In NR, a pool of SRS resources can be RRC configured in SRS config IE, where each SRS resource is configured with a unique SRS resource ID. The number of SRS ports is configured per SRS resource by setting the parameter nrofSRS-Ports to 1, 2 or 4. One or multiple SRS resource sets can be configured, where each SRS resource set can be configured with one or more SRS resources from the pool of SRS resources. To indicate which SRS resources is associated with a certain SRS resource set, the parameter srs-ResourceIdList is configured with N number of SRS resource ID(s).

The following disclosure will be divided into multiple different embodiments:

1. MAC-CE is used to activate/deactivate one or multiple SRS resource(s).
        a. The SRS resources will be activated/deactivated in all SRS resource sets where they are configured.
    2. MAC-CE is used to activate/deactivate one or multiple SRS resource(s) for a given SRS resource set.
    3. MAC-CE is used to change the number of SRS ports for one or multiple SRS resources.
    4. MAC-CE is used to change the number of SRS ports for all the SRS resources in an SRS resource set.
    5. MAC-CE is used to change the number of SRS ports per SRS resource for one SRS resource set.
    6. MAC-CE is used to change the number of SRS ports for one or multiple SRS resources and when the number of SRS ports are reduced, the MAC-CE can indicate which SRS ports that should remain (and in that way implicitly indicate which UE antennas to be sounded).

In the embodiments outlined below, a number of MAC-CE messages will be described where it is assumed that a UE can be configured with maximum 16 SRS resource sets per bandwidth part (BWP) per cell, maximum 16 SRS resources per set and maximum 64 SRS resources per BWP per cell. Note that the MAC-CE may look different if these values are extended as the field lengths need to be extended as well, and the MAC-CE has always an octet structure.

Certain embodiments introduce an extension of the gNB to UE signaling (e.g. MAC-CE signaling) that allows for (semi-static) switch between ASCs, in case the UE has reported capability that is supports multiple ASCs (note that the flexible SRS configuration described in this disclosure might not have to follow the supported ASCs that the UE has reported in UE capability signaling). In addition, in case the selected ASC implies transmitting SRS from a subset of all antennas, in certain embodiments, the signaling (e.g. by MAC CE) from gNB includes an indication of which subset of antennas shall be used by the UE.

Embodiment 1 (MAC-CE is Used to Activate/Deactivate One or Multiple SRS Resource(s))

In this embodiment a MAC-CE is used to activate/deactivate one or several SRS resource(s). If an SRS resource is deactivated, the UE should skip transmission of that SRS resource, even if it is included in an SRS resource set that is triggered for transmission.

In one alternate of this embodiment each SRS resource is RRC configured with an additional field indicating if the SRS resource is activated or de-activated upon receiving the RRC configuration, or upon completing a handover, addition of secondary cell (SCell) or primary secondary cell (PSCell), as schematically illustrated by the yellow part in FIG. 8 (highlighting the line that begins with "activationStatus-R17").

In one alternate of this embodiment, when an SRS resource is RRC configured it is assumed to be activated by default.

FIG. 9 illustrates one example of a MAC-CE message for this embodiment. The length of this MAC-CE message can be fixed and equals the number of configured SRS resources, or the length can be adaptable. In case it is adaptable an extra field is needed to indicate the number of SRS resource IDs that should be activated/deactivated, or UE understands the number of SRS resource IDs based on the length field included in the MAC-CE header. The MAC-CE contains the following fields:

R: Reserved bits.
    A/D: Which indicates if the SRS resource ID included in the same Octave should be activated or deactivated.
    Serving Cell ID: This field indicates the identity of the Serving Cell for which the MAC-CE applies. The length of the field is 5 bits.
    BWP ID: This field contains the ID corresponding to a downlink bandwidth part for which the MAC-CE applies. The BWP ID is given by the higher-layer parameter BWP-Id as specified in 3GPP TS 38.331. The length of the BWP ID field is 2 bits since a UE can be configured with up to 4 BWPs for DL.
    SRS Resource ID: Contains the higher-layer parameter srs-ResourceId as specified in 3GPP TS 38.331. The length of the SRS resource ID field is 6 bits since 64 SRS resources can be configured per BWP. Note that here, if the SRS resource ID length is 7 bits instead of 6 bits, the octet does not include the R field.

FIG. 10 illustrates another example of a MAC-CE. This MAC-CE contains a variable number of fields Si: If the UE is configured with an SRS resource with SRS resource ID i, then the field Si indicates the activation/deactivation status of the SRS resource with SRS resource ID i. If the UE is not configured with an SRS resource with SRS resource ID i, the MAC entity shall ignore the Si field. The Si field is set to "1" to indicate that the SRS resource with SRS resource ID i shall be activated. The Si field is set to "0" to indicate that the SRS resource with SRS resource ID i shall be deactivated.

Embodiment 2 (MAC-CE is Used to Activate/Deactivate One or Multiple SRS Resource(s) for a Given SRS Resource Set)

As described above the SRS resources configured in an SRS resource set are defined by the parameter srs-ResourceIdList which contains up to N=16 SRS resource ID(s). In this embodiment a MAC-CE message is used to indicate which of the configured SRS resource(s) in srs-ResourceIdList of a specific SRS resource set that should be activated/deactivated. If an SRS resource that is configured in an SRS resource set is deactivated the UE should omit the transmission of this SRS resource when the SRS resource set is triggered for transmission (however, the SRS resource could still be included and being triggered in another SRS resource set).

In one alternate of this embodiment, if an SRS resource belongs to two different sets and both sets are configured to transmit said resource in the slot $n_{slot}$, the SRS resource will be transmitted in $n_{slot}$ if the SRS resource is activated in either of the two sets.

In one alternate of this embodiment each SRS resource set is RRC configured with a new list indicating if the configured SRS resource(s) in srs-ResourceIdList of the SRS resource set is activated or deactivated, upon receiving the RRC configuration, or upon completing a handover, addition of SCell or PSCell, as schematically illustrated by the yellow part in FIG. 11 (highlighting the line that begins "srs-ResourceIdActivationStatus"). This new list srs-ResourceIdActivationStatus contains a Boolean flag for each SRS resource ID listed in the parameter srs-ResourceIdList of the SRS resource set. If the Boolean flag is set to "1", the corresponding SRS resource is considered to be activated for this SRS resource set (i.e., the SRS resource should be transmitted when the SRS resource set is triggered), and if the Boolean flag is set to "0", the SRS resource is considered to be deactivated (i.e., the SRS resource should NOT be transmitted when the SRS resource set is triggered). Each Boolean flag in the parameter srs-ResourceIdActivationStatus can be implicitly associated to each of the SRS resources listed in the parameter srs-ResourceIdList. One way to do the implicit association is to let the first Boolean flag from the left in the list srs-ResourceIdActivationStatus be associated with the SRS resource with lowest SRS resource ID, let the second Boolean flag from the left in the list srs-ResourceIdActivationStatus be associated with the SRS resource with second lowest SRS resource ID, and so on. Note that this is just one example of how the implicit association can be made between the entries in the new parameter srs-ResourceIdActivationStatus and the SRS resources listed in the parameter srs-ResourceIdList, and other ways are possible.

In one alternate of this embodiment, when an SRS resource set is RRC configured, it is assumed that all the configured SRS resources of that SRS resource set are activated by default.

FIG. 12 illustrates one example of a MAC-CE message for this embodiment. The length of this MAC-CE message can be fixed and equals the number of configured SRS resources, or it can be adaptable. In case it is adaptable an extra field is needed to indicate the number of SRS resource ID(s) that should be activated/deactivated (in one alternate of this embodiment, one of the R fields could be used for this purpose), or UE understands the number of SRS resource IDs based on the length field included in the MAC-CE header. The MAC-CE contains the additional field (compared to the embodiment seen in FIG. 9):

SRS Resource set ID: Contains the higher layer parameter srs-ResourceSetId as specified in 3GPP TS 38.331. The length of the SRS resource Set ID field is 4 bits since 16 SRS resource sets can be configured per BWP.

FIG. 13 illustrates another example of a MAC-CE. This MAC-CE can contain either a variable number of fields Si or a fixed number of fields Si. In one alternate of this embodiment, if the UE is configured with an SRS resource set with N SRS resources, the number of fields Si can be equal to N. In another alternate of this embodiment, since the maximum number of SRS resources that can be configured in an SRS resource set is 16, N is fixed to 16.

The fields Si indicates the activation/deactivation of a Boolean flag of position i in the new list srs-ResourceIdActivationStatus. Since there is an implicit association between the SRS resource configured in the SRS resource set and the position of the Boolean flag in the new parameter srs-ResourceIdActivationStatus, the MAC-CE message will indirectly activate/deactivate SRS resources of the indicated SRS resource set by setting the Boolean flag to one or zero.

Embodiment 3 (MAC-CE is Used to Change the Number of SRS Ports for One or Multiple SRS Resources)

As described above, each SRS resource is configured with N=1, 2 or 4 SRS ports. In this embodiment a MAC-CE message is used to update the number of SRS ports for one or multiple SRS resources.

In one alternate of this embodiment each SRS resource is configured with a list of candidate number of SRS ports, as schematically illustrated with the yellow part in FIG. 14 (highlighting the line that begins "CandidateListOFNumberOfSrsPorts-r17"). For example, a new field CandidateListOfNumberOfSrsPorts-r17 can be configured with N candidate SRS ports, e.g., [1 SRS port, 2 SRS ports, 3 SRS ports, 4 SRS ports] for a four-port SRS resource with capability 1tr4-2tr4.

In one alternate of this embodiment, irrespectively of the number of SRS ports that are configured through the field CandidateListOfNumberOfSrsPorts-r1, parameters in Clause 6.4.1.4.3 of 3GPP TS 38.211 that depend on the number of antenna ports $$N_{ap}^{SRS},$$

e.g., the frequency-domain starting position $$k_0^{(p_i)}$$

and the cyclic shift $\alpha_i$, will be derived based the number of antenna ports $$N_{ap}^{SRS}$$

specified by the field nrofSRS-Ports.

In another alternate of this embodiment, no new parameter is introduced, instead the MAC-CE updates the old SRS parameter nrofSRS-Ports. This might be problematic though, since some parameters in 3GPP TS 38.211 (i.e., port-specific cyclic shifts and, for four-port SRS resources, port-specific comb offset are dependent on the number of ports of the SRS resource. If we suddenly change nrofSRS-Ports, those parameters will change as well and we might get collisions with other UEs SRS configurations. One way to solve this is to include some of these parameter settings in the MAC-CE as well or to make sure that the UE somehow knows the original value and uses that to decide these parameters.

FIG. 15 illustrates one example of a MAC-CE message for this embodiment. The length of this MAC-CE message can be fixed and equals the number of configured SRS resources, or it can be adaptable. The MAC-CE contains the additional field (compared to previous embodiments):

Number of SRS ports: Contains an indication of the number of SRS Ports that should be assume for the SRS resource ID indicated in the same octave. Number of SRS ports can either directly indicate the number of SRS Ports (e.g., '00' indicates 1 SRS port, '01' indicates 2 SRS ports, and so on), or it can indicate an index of the RRC configured list CandidateListOfNumberOfSrsPorts-r17.

Embodiment 4 (MAC-CE is Used to Change the Number of SRS Ports for all the SRS Resources in an SRS Resource Set)

In NR Rel-15/16 the number of SRS Ports for all SRS resources belonging to one SRS resource set have to be the same (except for an SRS resource set with usage 'codebook' and with NR Rel-16 full power mode 2, where different number of SRS Ports can be configured for the different SRS resources).

In one alternate of this embodiment, MAC-CE is used to determine one common number of SRS ports that should be used for all the SRS resources configured in the indicated SRS resource set. When the indicated SRS resource set is triggered for transmission, the UE should transmit the indicated number of SRS ports for each SRS resource belonging to that SRS resource set. For example, assume that one SRS resource set is configured with two SRS resources, and where each SRS resource is configured with two SRS ports (as would be the case for an SRS resource set with usage 'antennaSwitching' for 2T4R). Assume that a MAC-CE message is used to indicate that each SRS resource in the SRS resource set only should use one SRS port, in this case, when the SRS resource set is triggered, two single-port SRS resource should be transmitted from the UE (instead of two dual-port SRS resources as was the default configuration).

In one alternate of this embodiment, a new parameter is configured on SRS resource set level indicating the number of SRS ports that should be used for all SRS resources when this SRS resource set is triggered. One example of this is illustrated in the yellow part of FIG. 16 (highlighting the line that begins with "srs-numberOfPortsPerResourcePerSet-r17"), where a new parameter srs-numberOfPortsPerResource-r17is defined per SRS resource set. When this parameter is configured, the number of SRS ports configured per SRS resource should be ignored when this SRS resource set is triggered. A MAC-CE can be used to update this parameter.

FIG. 17 illustrates one example of a MAC-CE message for this embodiment. The MAC-CE contains the additional field (compared to previous embodiments):

Number SRS ports: Indicates the value of the parameter srs-numberOfPortsPerResourcePerSet-r17 described above.

In one alternate of this embodiment, irrespectively of the number of SRS ports that are configured through the field numberOfPortsPerResourcePerSet-r17, parameters in Clause 6.4.1.4.3 of 3GPP TS 38.211 that depend on the number of antenna ports $$N_{ap}^{SRS},$$

e.g., the frequency-domain starting position $$k_0^{(p_i)}$$

and the cyclic shift $\alpha_i$, will be derived based the number of antenna ports $$N_{ap}^{SRS}$$

specified by the field nrofSRS-Ports.

Embodiment 5 (MAC-CE is Used to Change the Number of SRS Ports Per SRS Resource for One SRS Resource Set)

In this embodiment the MAC-CE is allowed to choose the number of SRS ports separately for each SRS resource in an SRS resource set. The MAC-CE has flexible size and the UE knows from the RRC configuration how many SRS resources there is for the given SRS resource set and thus how many SRS port fields it can expect in the MAC-CE. Additionally, the R field may be used as A/D field which tells whether this SRS resource set is activated or deactivated. Only if the SRS resource set is activated the fields indicating the number of SRS ports are present. FIG. 18 illustrates an example.

In one alternate of this embodiment, irrespectively of the number of SRS ports that are configured, parameters in Clause 6.4.1.4.3 of 3GPP TS 38.211 that depend on the number of antenna ports $$N_{ap}^{SRS},$$

e.g., the frequency-domain starting position $$k_0^{(p_i)}$$

and the cyclic shift $\alpha_i$, will be derived based the number of antenna ports $$N_{ap}^{SRS}$$

specified by the field nrofSRS-Ports.

Embodiment 6 (MAC-CE is Used to Change the Number of SRS Ports for One or Multiple SRS Resources and when the Number of SRS Ports are Reduced, the MAC-CE can Indicate which SRS Ports that should Remain (and in that Way Implicitly Indicate which UE Antennas to be Sounded))

In another embodiment, in addition to the number of ports, also the exact ports are RRC configured for the SRS resource. It may be that each SRS resource is configured with alternative assumptions for the antenna ports. Similar to the above example, where MAC-CE selects the value for the number of antenna ports, either for all resource in a set, or per any SRS resource, the MAC-CE may select the exact antenna ports among the RRC configured options. For example, RRC may configure certain antenna ports that may be called as set of antenna ports, and then another set of antenna ports and MAC-CE may select between these sets. Alternatively, RRC codes all possible antenna ports for an SRS resource and the MAC-CE selects from these the exact antenna ports UE should assume for this SRS set. Here, RRC may configure the default assumptions for either case so UE does not have to wait for the MAC-CE to know which antenna ports to assume. That is, RRC may configure initial assumption for the UE upon configuration, HO, SCell or PSCell addition.

The MAC CE examples for the above embodiment for the two choices "For example, RRC may configure certain antenna ports that may be called as set of antenna ports, and then another set of antenna ports and MAC CE may select between these sets. Alternatively, RRC codes all possible antenna ports for an SRS resource (or this is assumed without RRC configuration) and the MAC CE selects from these the exact antenna ports UE should assume for this SRS set." This can be presented by any of the above MAC CEs, where the field "number of ports" is replaced by "indication for the set of antenna ports" or "indication of the exact antenna ports".

In one alternate of this embodiment, irrespectively of which set of SRS ports that are configured, parameters in Clause 6.4.1.4.3 of 3GPP TS 38.211 that depend on the number of antenna ports $$N_{ap}^{SRS},$$

e.g., the frequency-domain starting position $$k_0^{(p_i)}$$

and the cyclic shift $\alpha_i$, will be derived based the number of antenna ports $$N_{ap}^{SRS}$$

specified by the field nrofSRS-Ports.

Figure 19:
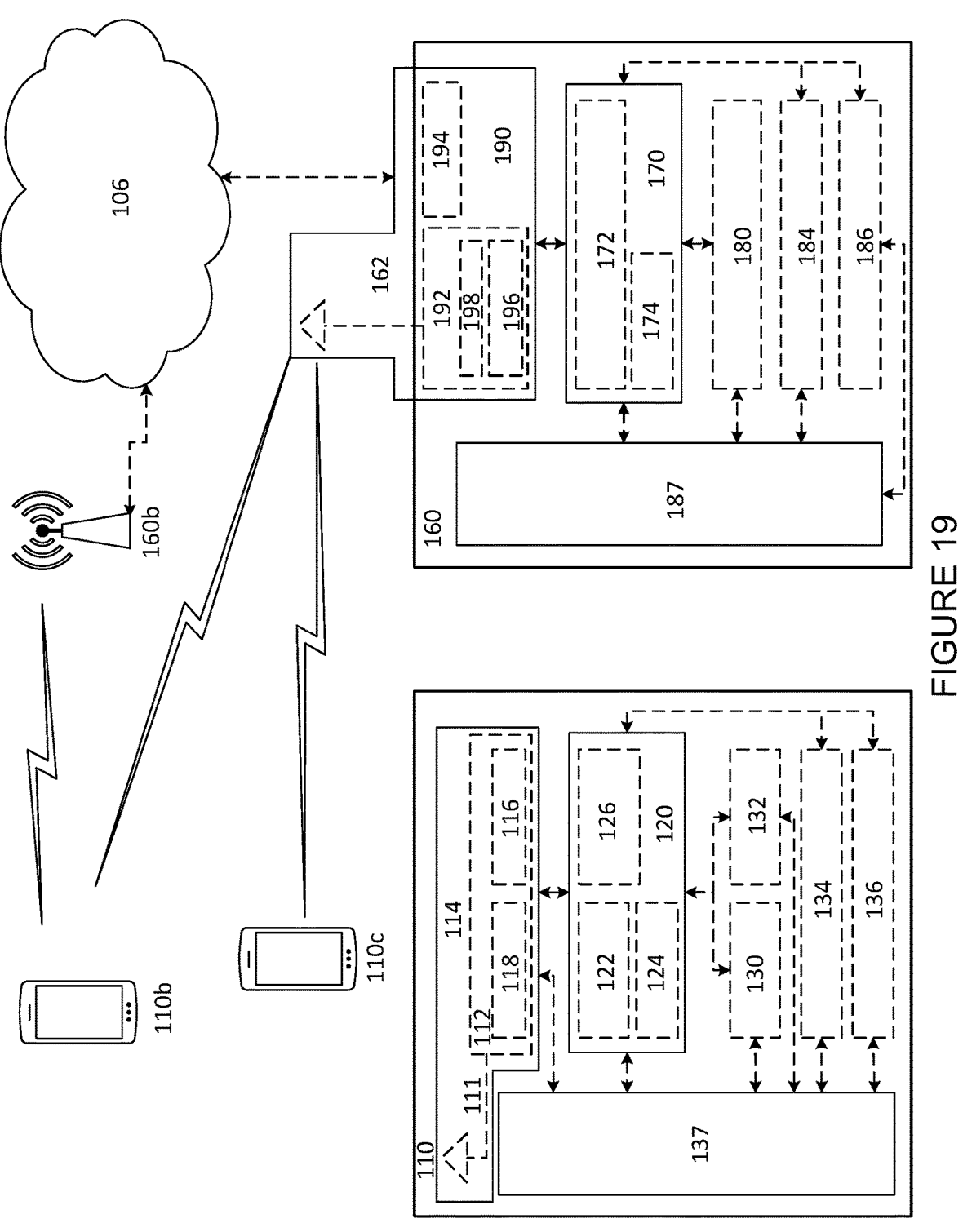
FIG. 19 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2nd Generation (2G), 3rd Generation (3G), 4th Generation (4G), or 5th Generation (5G) standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M)

nodes, Operations Support System (OSS) nodes, Self-Optimized Network (SON) nodes, positioning nodes (e.g., Evolved-Serving Mobile Location Centres, E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 160 includes processing circuitry 170, device readable medium 180, interface 190, auxiliary equipment 184, power source 186, power circuitry 187, and antenna 162. Although network node 160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of radio frequency (RF) transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 19 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 20:
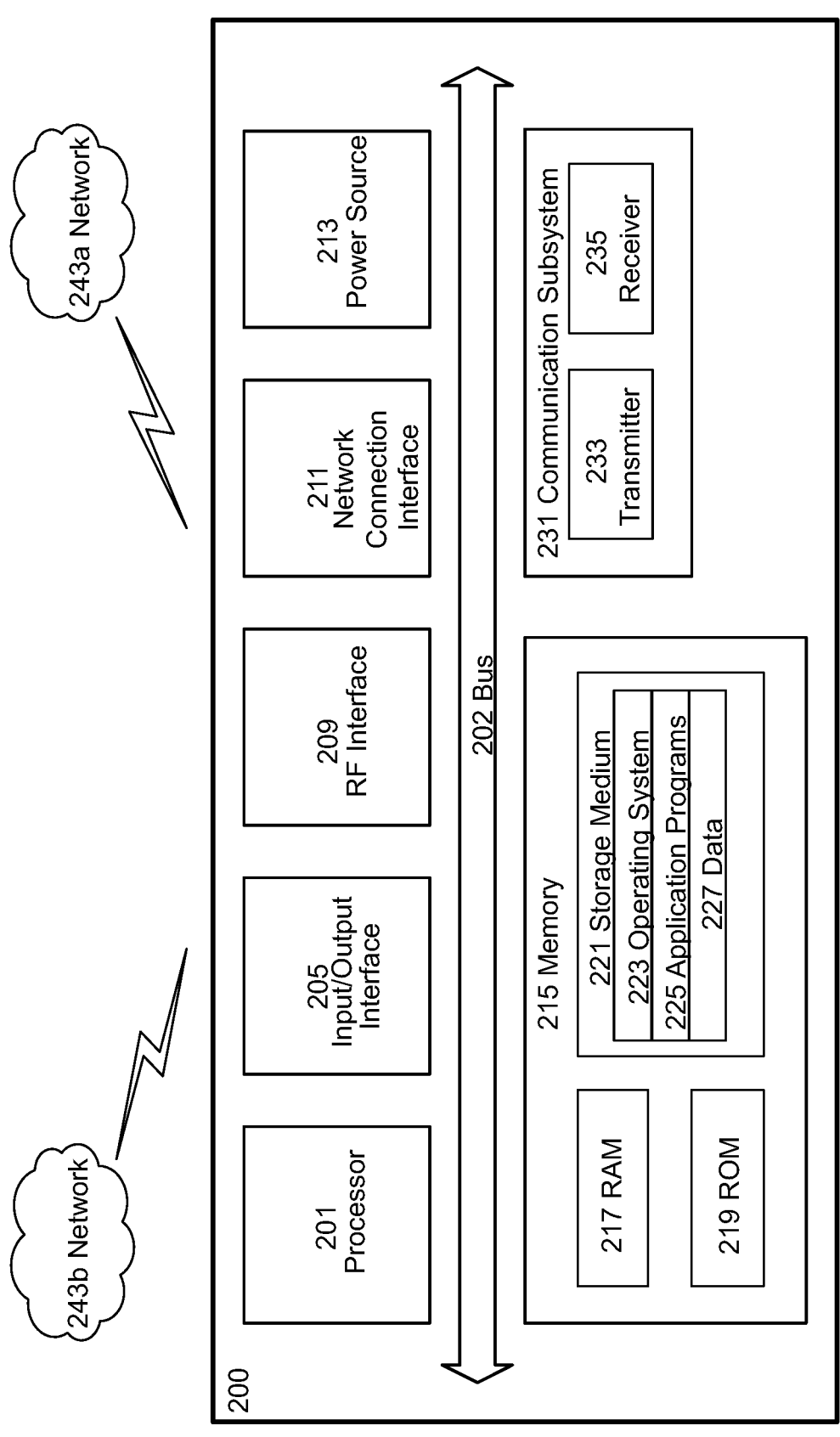
FIG. 20 illustrates an example of User Equipment in accordance with some embodiments.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 20, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 20, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the radio access network (RAN) links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 21:
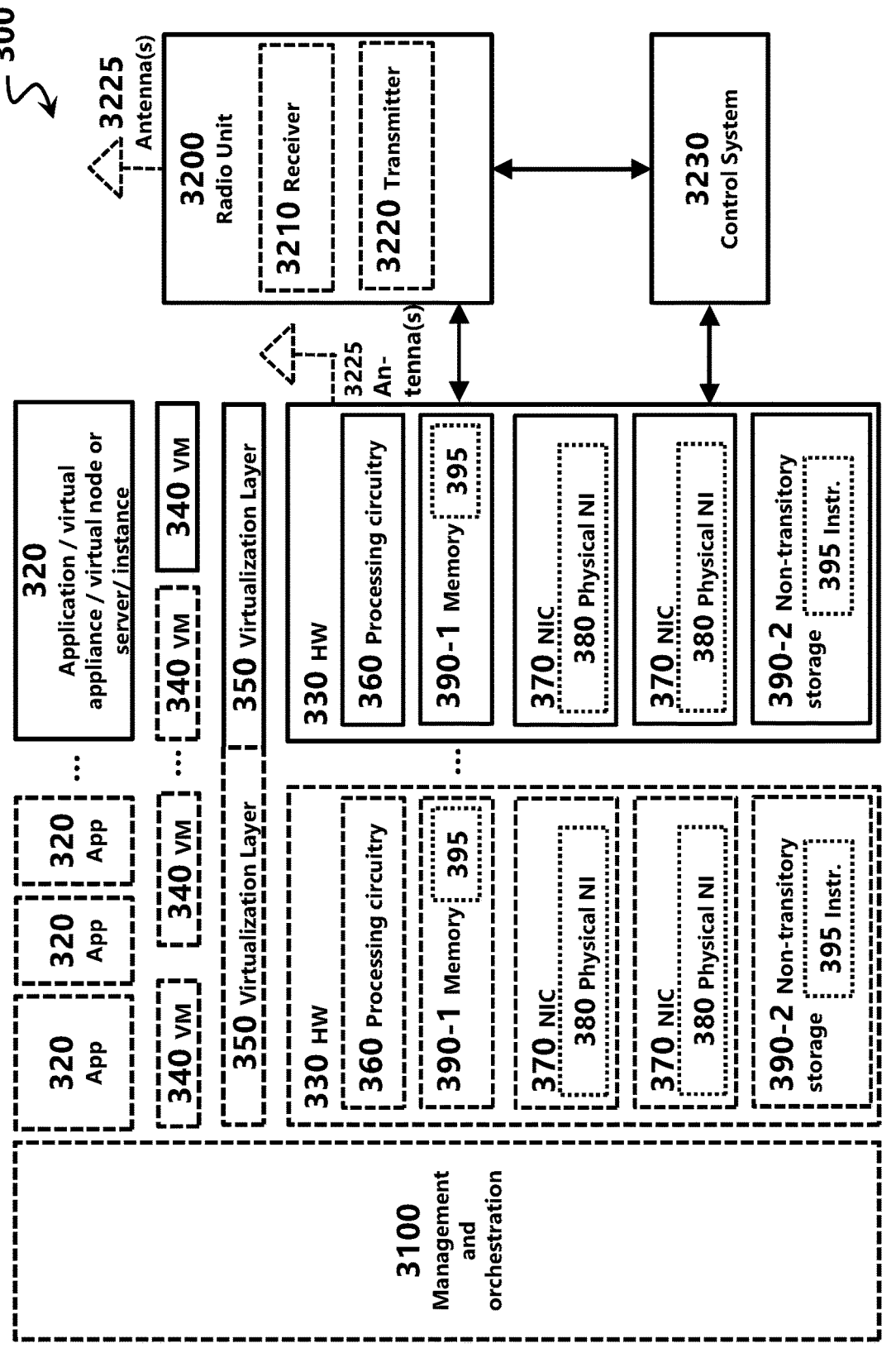
FIG. 21 illustrates an example virtualization environment in accordance with some embodiments.

FIG. 21 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 21, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 21.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 22:
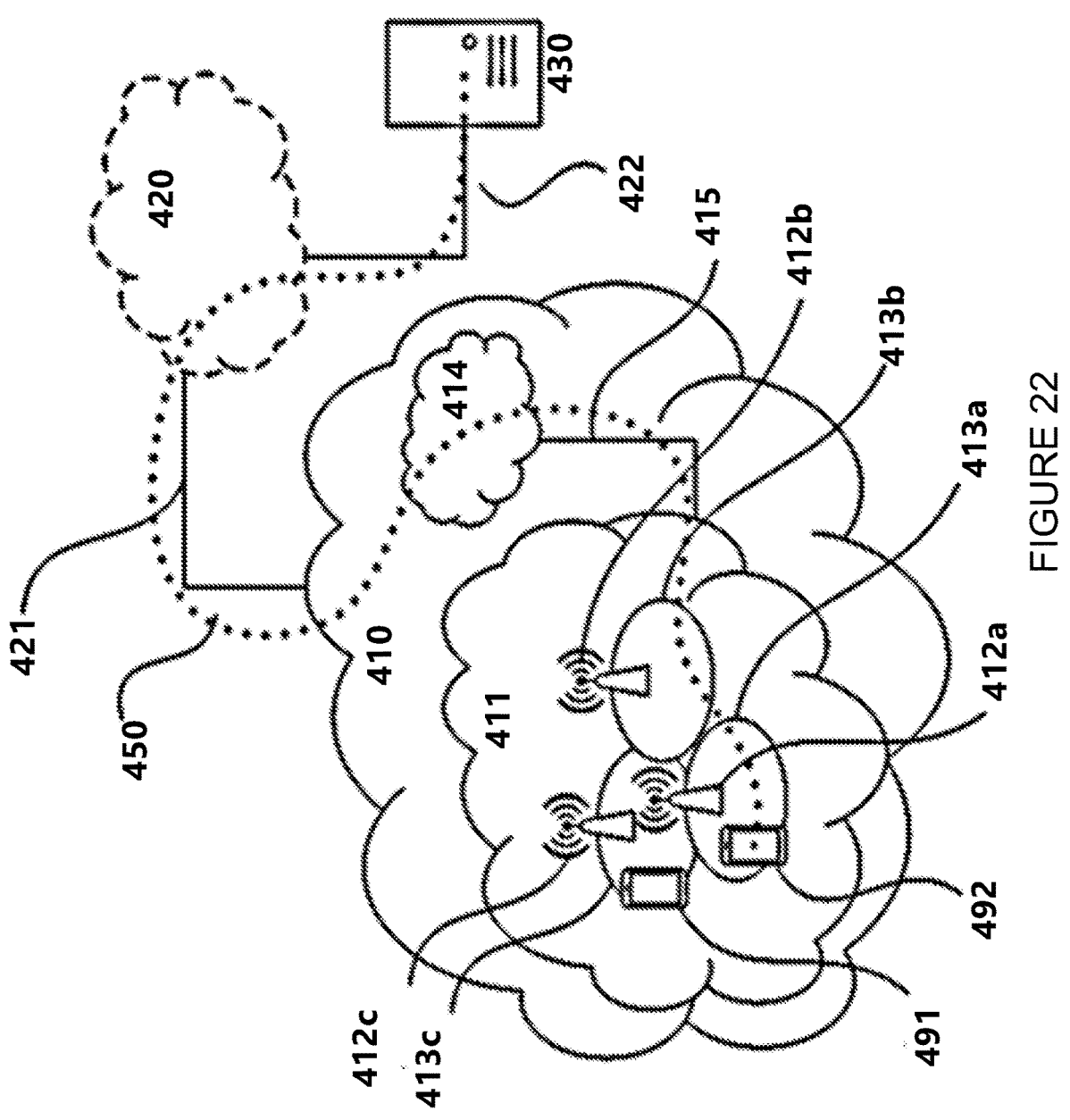
FIG. 22 illustrates an example telecommunication network connected via an intermediate network to a host computer in accordance with some embodiments.

With reference to FIG. 22, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 22 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 23. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 23) served by base station 520. Communication interface 526 may be configured to facilitate connection 560 to host computer 510. Connection 560 may be direct or it may pass through a core network (not shown in FIG. 23) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 23:
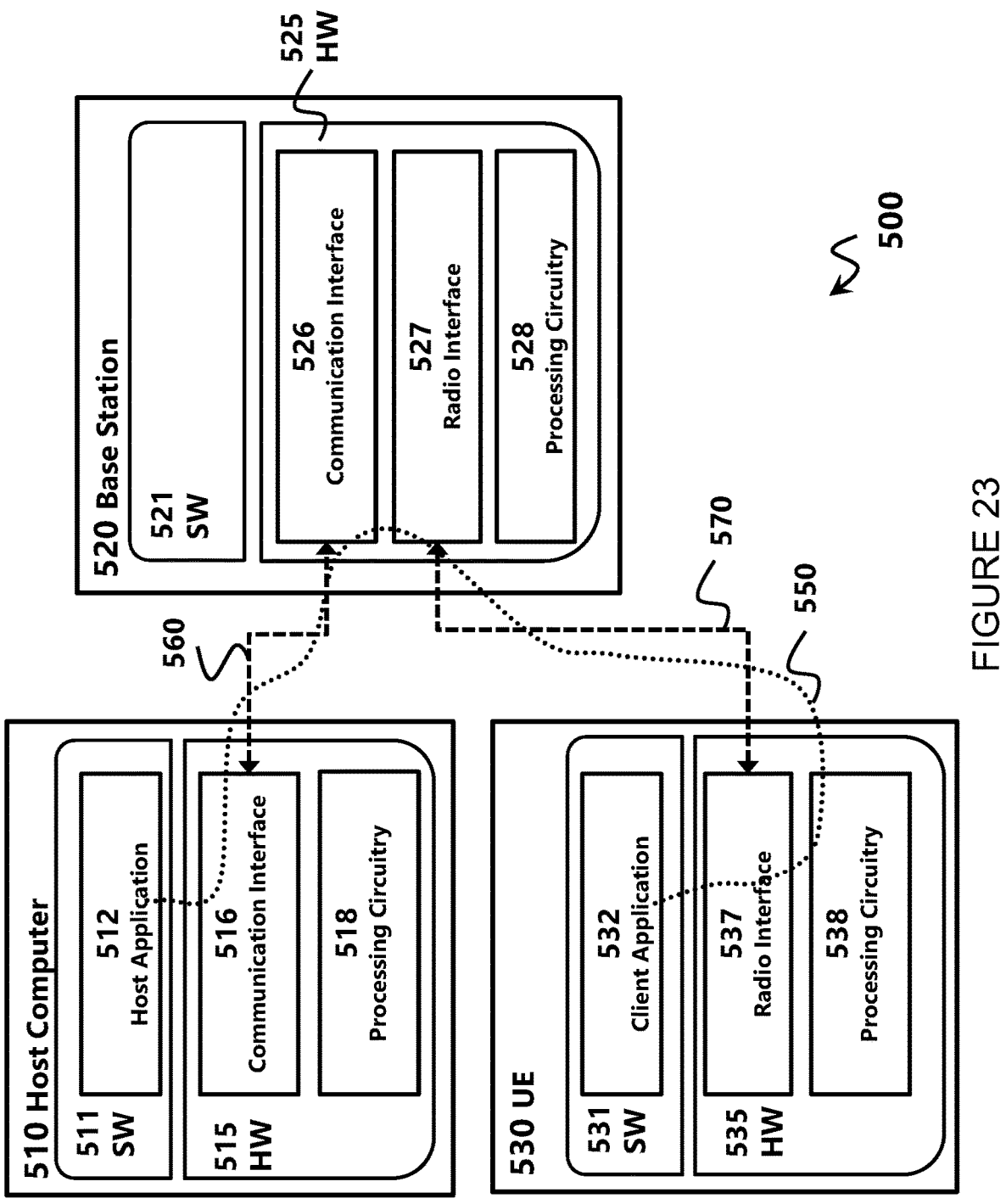
FIG. 23 illustrates an example of a host computer communicating via a base station with a user equipment over a partially wireless connection in accordance with some embodiments.

It is noted that host computer 510, base station 520 and UE 530 illustrated in FIG. 23 may be similar or identical to host computer 430, one of base stations 412a, 412b, 412c and one of UEs 491, 492 of FIG. 22, respectively. This is to say, the inner workings of these entities may be as shown in FIG. 23 and independently, the surrounding network topology may be that of FIG. 22.

In FIG. 23, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 24, 25:
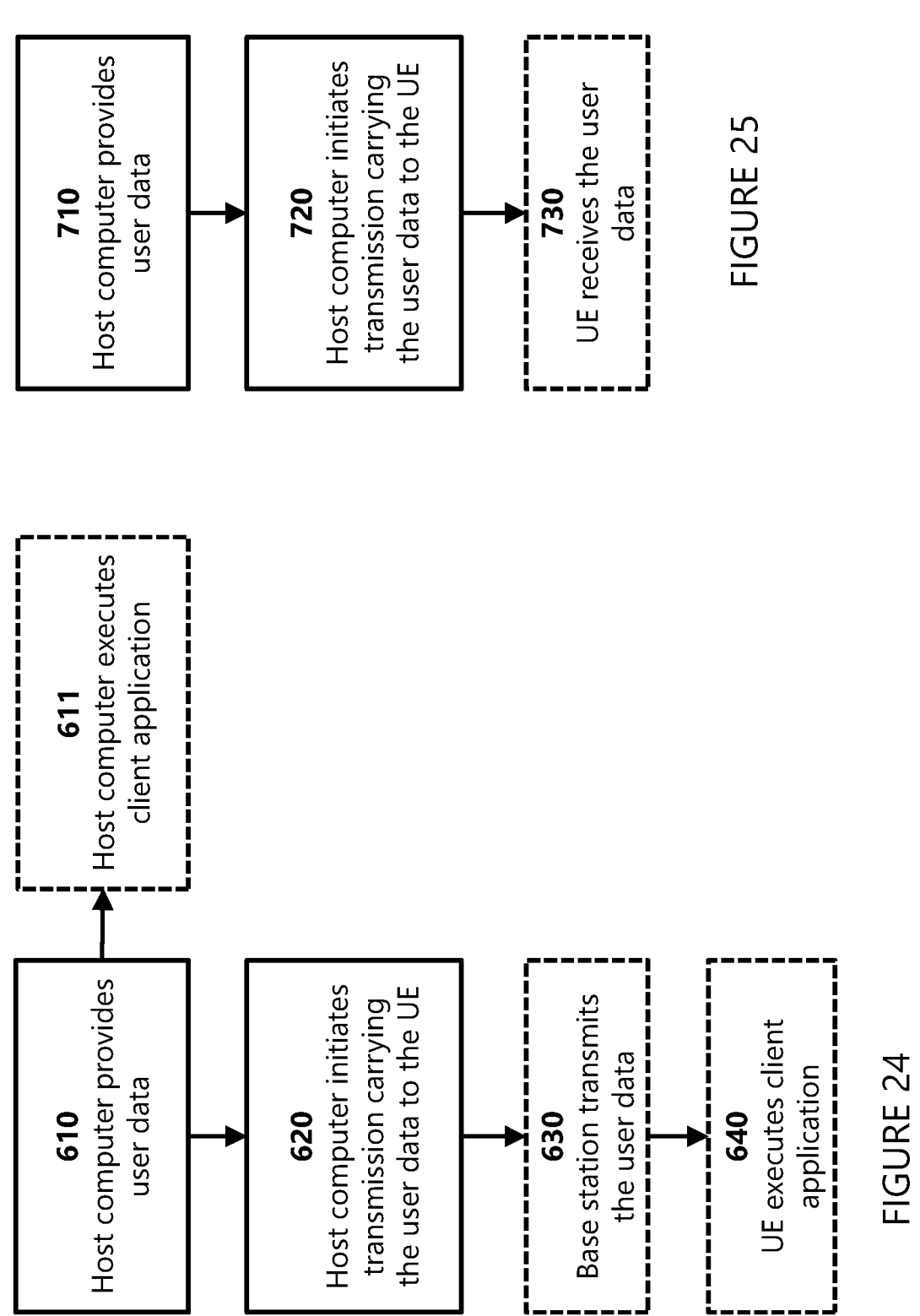
FIG. 24 illustrates example methods implemented in a communication system including a host computer, a base station and a user equipment in accordance with some embodiments.
FIG. 25 illustrates example methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 28:
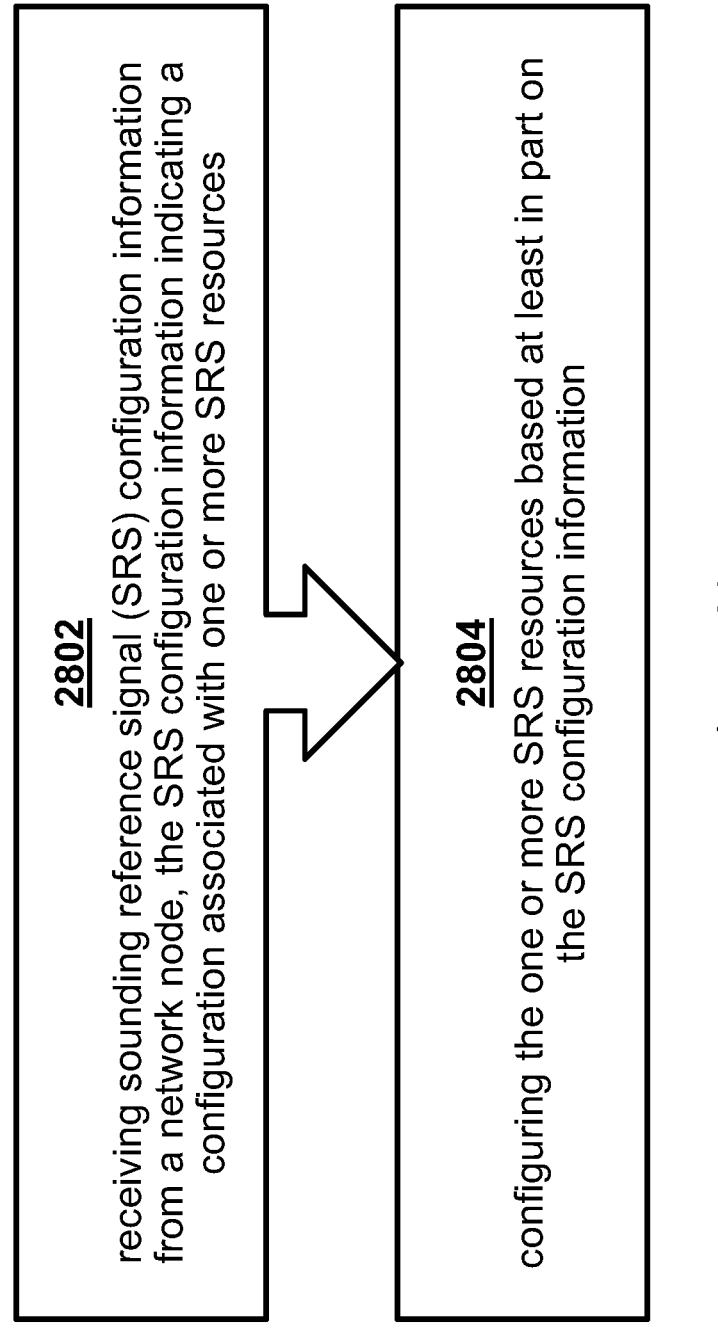
FIG. 28 illustrates an example of a method in accordance with some embodiments.

FIGS. 28 and 29 depicts methods in accordance with particular embodiments. In certain embodiments, the method of FIG. 28 may be performed by a wireless device, such as wireless device 110 or UE 200 described above. In certain embodiments, the method of FIG. 29 may be performed by a network node, such as network node 160 (e.g., gNB, Transmission and Reception Point (TRP), or other network node). In some embodiments, the wireless device and the network node may perform reciprocal functionality.

For example, a wireless device may send a message that the network node receives, and vice versa.

The method of FIG. 28 begins at step 2802 with receiving SRS configuration information from a network node. The SRS configuration information indicates a configuration associated with one or more SRS resources. Examples of SRS configuration information include the SRS configuration information described below with respect to the "Group A" embodiments and/or "Group B" embodiments. Additional examples of SRS configuration information include the information related to SRS and/or ASC configuration described above, such as the information provided in any of the MAC-CE messages described above under the following headings:

Embodiment 1 (MAC-CE is used to activate/deactivate one or multiple SRS resource(s))

Embodiment 2 (MAC-CE is used to activate/deactivate one or multiple SRS resource(s) for a given SRS resource set)

Embodiment 3 (MAC-CE is used to change the number of SRS ports for one or multiple SRS resources)

Embodiment 4 (MAC-CE is used to change the number of SRS ports for all the SRS resources in an SRS resource set)

Embodiment 5 (MAC-CE is used to change the number of SRS ports per SRS resource for one SRS resource set)

Embodiment 6 (MAC-CE is used to change the number of SRS ports for one or multiple SRS resources and when the number of SRS ports are reduced, the MAC-CE can indicate which SRS ports that should remain (and in that way implicitly indicate which UE antennas to be sounded))

The method proceeds to step 2804 with configuring the one or more SRS resources based at least in part on the SRS configuration information. Once the SRS resources have been configured, the wireless device may perform sounding according to the configuration.

The method of FIG. 29 begins at step 2902 with determining SRS configuration information to be applied by a wireless device. The SRS configuration information indicates a configuration associated with one or more SRS resources. Examples of SRS configuration information are described with respect to FIG. 28 (step 2802). The method of FIG. 29 continues to step 2904 with sending the SRS configuration information to the wireless device. In certain embodiments, the method proceeds to step 2906 with receiving SRSs from the wireless device according to the SRS configuration information. In certain embodiments, the method includes using information determined based on the SRSs to perform at least one of: scheduling, link adaptation, MIMO operations, and/or beam management, as shown in step 2908.

Figure 30:
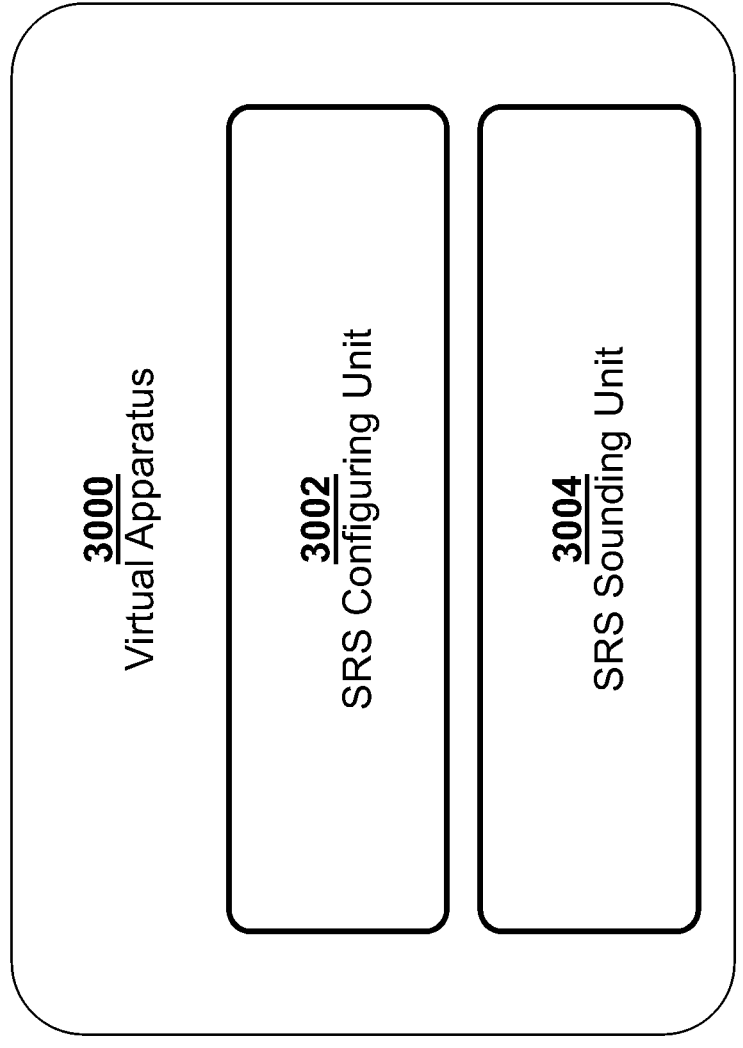
FIG. 30 illustrates an example virtualization apparatus in accordance with some embodiments.

FIG. 30 illustrates a schematic block diagram of an apparatus 3000 in a wireless network (for example, the wireless network shown in FIG. 19). The apparatus may be implemented in a wireless device or network node (e.g., wireless device 110 or network node 160 shown in FIG. 19). Apparatus 3000 is operable to carry out the example method described with reference to FIG. 28 or 29 and possibly any other processes or methods disclosed herein. It is also to be understood that the method of FIG. 28 or 29 is not necessarily carried out solely by apparatus 3000. At least some operations of the method can be performed by one or more other entities.

Virtual Apparatus 3000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause SRS configuring unit 3002, SRS sounding unit 3004, and any other suitable units of apparatus 3000 to perform corresponding functions according one or more embodiments of the present disclosure.

As illustrated in FIG. 30, apparatus 3000 includes SRS configuring unit 3002 and SRS sounding unit 3004. In wireless device implementations, SRS configuring unit 3002 is configured to receive SRS configuration information from a network node. The SRS configuration information indicates a configuration associated with one or more SRS resources. SRS configuring unit 3002 is further configured to apply the received SRS configuration information. SRS sounding unit 3004 is configured to send sounding reference signals to the network node using the configured SRS resources.

In network node implementations, SRS configuring unit 3002 is configured to determine SRS configuration information for a wireless device. The SRS configuration information indicates a configuration associated with one or more SRS resources. SRS configuring unit 3002 is further configured to send the SRS configuration information to the wireless device. SRS sounding unit 3004 is configured to receive sounding reference signals to the network node (e.g., SRSs that the wireless device sends using the configured SRS resources). SRS sounding unit 3004 may use information determined based on the SRSs to perform at least one of: scheduling, link adaptation, MIMO operations, and/or beam management.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
   receiving sounding reference signal (SRS) configuration information from a network node, the SRS configuration information indicating a configuration associated with one or more SRS resources; and configuring the one or more SRS resources based at least in part on the SRS configuration information.

2. The method of embodiment 1, wherein the SRS configuration information comprises one or more SRS resource identifiers, each SRS resource identifier indicating a respective one of the SRS resources to which a portion of the SRS configuration information that is associated with said SRS resource identifier applies.

3. The method of any of embodiments 1-2, wherein the SRS configuration information indicates a number of SRS ports configured per each of the one or more SRS resources.

4. The method of any of embodiments 1-3, wherein SRS configuration information indicates the configuration associated with the one or more SRS resources according to one or more SRS resource sets.

5. The method of any of embodiments 1-4, wherein each SRS resource set comprises at least one of the one or more SRS resources.

6. The method of any of embodiments 1-5, wherein the SRS configuration information comprises one or more SRS resource set identifiers, each SRS resource set identifier indicating a respective set of the SRS resources to which a portion of the SRS configuration information that is associated with said SRS resource set identifier applies.

7. The method of any of embodiments 1-6, wherein the SRS resource set identifier is associated with a list of SRS resource identifiers corresponding to the one or more SRS resources belonging to said SRS resource set.

8. The method of any of embodiments 1-7, wherein the SRS configuration information indicates to activate or deactivate one or more of the indicated SRS resources.

9. The method of any of embodiments 1-8, wherein the SRS configuration information indicates to activate or deactivate one or more of the SRS resource sets, wherein activating a given SRS resource set comprises activating each SRS resource in said SRS resource set and deactivating the given SRS resource set comprises deactivating each SRS resource in said SRS resource set.

10. The method of any of embodiments 1-9, wherein the SRS configuration information indicates to activate or deactivate a given SRS resource with respect to each SRS resource set in which said SRS resource has been configured.

11. The method of any of embodiments 1-10, wherein the SRS configuration information indicates to activate or deactivate one or more of the SRS resource(s) for a given SRS resource set.

12. The method of any of embodiments 1-11, wherein the SRS configuration information indicates to change a number of SRS ports for at least one of the one or more SRS resources.

13. The method of embodiment 12, wherein, when the number of SRS ports is reduced, the SRS configuration information further indicates which of the SRS ports should remain configured.

14. The method of any of embodiments 1-13, wherein the SRS configuration information indicates which antennas of the wireless device are to be sounded.

15. The method of embodiment 14, wherein the indication comprises an implicit indication of which antennas of the wireless device are to be sounded.

16. The method of embodiment 14, wherein the indication comprises an explicit indication of which antennas of the wireless device are to be sounded.

17. The method of any of embodiments 1-16, wherein the SRS configuration information indicates to change a number of SRS ports for all of the SRS resources in an SRS resource set.

18. The method of any of embodiments 1-16, wherein the SRS configuration information indicates to change a number of SRS ports per SRS resource for one SRS resource set.

19. The method of any of embodiments 1-18, wherein the SRS configuration information indicates an antenna switching configuration (ASC).

20. The method of any of embodiments 1-19, wherein at least a portion of the SRS configuration information is received in one or more Medium Access Control (MAC) Control Element (CE) messages.

21. The method of any of embodiments 1-20, wherein at least a portion of the SRS configuration information is received in radio resource control (RRC) signaling.

22. The method of any of embodiments 1-21, further comprising performing sounding when the one or more SRS resources have been configured based at least in part on the SRS configuration information.

23. The method of any of embodiments 1-22, wherein performing sounding comprises sending one or more SRSs to the network node.

24. The method of any of the previous embodiments, further comprising:
   providing user data; and
   forwarding the user data to a host computer via the transmission to the base station.

Group B Embodiments

25. A method performed by a network node (e.g., a base station or other Transmission and Reception Point (TRP)), the method comprising:
   sending sounding reference signal (SRS) configuration information to a wireless device, the SRS configuration information indicating a configuration associated with one or more SRS resources.

26. The method of embodiment 25, wherein the SRS configuration information comprises one or more SRS resource identifiers, each SRS resource identifier indicating a respective one of the SRS resources to which a portion of the SRS configuration information that is associated with said SRS resource identifier applies.

27. The method of any of embodiments 25-26, wherein the SRS configuration information indicates a number of SRS ports configured per each of the one or more SRS resources.

28. The method of any of embodiments 25-27, wherein SRS configuration information indicates the configuration associated with the one or more SRS resources according to one or more SRS resource sets.

29. The method of any of embodiments 25-28, wherein each SRS resource set comprises at least one of the one or more SRS resources.

30. The method of any of embodiments 25-29, wherein the SRS configuration information comprises one or more SRS resource set identifiers, each SRS resource set identifier indicating a respective set of the SRS resources to which a portion of the SRS configuration information that is associated with said SRS resource set identifier applies.

31. The method of any of embodiments 25-30, wherein the SRS resource set identifier is associated with a list of SRS resource identifiers corresponding to the one or more SRS resources belonging to said SRS resource set.

32. The method of any of embodiments 25-31, wherein the SRS configuration information indicates to activate or deactivate one or more of the SRS resources.

33. The method of any of embodiments 25-32, wherein the SRS configuration information indicates to activate or deactivate one or more of the SRS resource sets, wherein activating a given SRS resource set comprises activating each SRS resource in said SRS resource set and deactivating the given SRS resource set comprises deactivating each SRS resource in said SRS resource set.

34. The method of any of embodiments 25-33, wherein the SRS configuration information indicates to activate or deactivate a given SRS resource with respect to each SRS resource set in which said SRS resource has been configured.

35. The method of any of embodiments 25-34, wherein the SRS configuration information indicates to activate or deactivate one or more of the SRS resource(s) for a given SRS resource set.

36. The method of any of embodiments 25-35, wherein the SRS configuration information indicates to change a number of SRS ports for at least one of the one or more SRS resources.

37. The method of embodiment 36, wherein, when the number of SRS ports is reduced, the SRS configuration information further indicates which of the SRS ports should remain configured.

38. The method of any of embodiments 25-37, wherein the SRS configuration information indicates which antennas of the wireless device are to be sounded.

39. The method of embodiment 38, wherein the indication comprises an implicit indication of which antennas of the wireless device are to be sounded.

40. The method of embodiment 38, wherein the indication comprises an explicit indication of which antennas of the wireless device are to be sounded.

41. The method of any of embodiments 25-40, wherein the SRS configuration information indicates to change a number of SRS ports for all of the SRS resources in an SRS resource set.

42. The method of any of embodiments 25-41, wherein the SRS configuration information indicates to change a number of SRS ports per SRS resource for one SRS resource set.

43. The method of any of embodiments 25-42, wherein the SRS configuration information indicates an antenna switching configuration (ASC).

44. The method of any of embodiments 25-43, wherein at least a portion of the SRS configuration information is sent in one or more Medium Access Control (MAC) Control Element (CE) messages.

45. The method of any of embodiments 25-44, wherein at least a portion of the SRS configuration information is sent in radio resource control (RRC) signaling.

46. The method of any of embodiments 1-21, further comprising receiving one or more SRSs from the wireless device configured according to the SRS configuration information.

47. The method of embodiment 46, further comprising using information determined based on the SRSs to perform at least one of: scheduling, link adaptation, MIMO operations, and/or beam management.

48. The method of any of embodiments 1-47, further comprising, prior to sending the SRS configuration information to the wireless device, determining the SRS configuration information to be sent.

49. The method of embodiment 48, wherein the SRS configuration information is determined based at least in part on capability information received from the wireless device, the capability information indicating that the wireless device supports multiple antenna switching configurations.

50. The method of any of embodiments 48-49, wherein the SRS configuration information is determined based at least in part based on radio conditions, network conditions, and/or wireless device performance.

51. The method of any of the previous embodiments, further comprising:
    obtaining user data; and
    forwarding the user data to a host computer or a wireless device.

Group C Embodiments

52. A wireless device, the wireless device comprising:
    processing circuitry configured to perform any of the steps of any of the Group A embodiments; and
    power supply circuitry configured to supply power to the wireless device.

53. A base station, the base station comprising:
    processing circuitry configured to perform any of the steps of any of the Group B embodiments;
    power supply circuitry configured to supply power to the base station.

54. A user equipment (UE), the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

55. A computer program, the computer program comprising instructions which when executed on a computer perform any of the steps of any of the Group A embodiments.

56. A computer program product comprising a computer program, the computer program comprising instructions which when executed on a computer perform any of the steps of any of the Group A embodiments.

57. A non-transitory computer-readable storage medium or carrier comprising a computer program, the computer program comprising instructions which when executed on a computer perform any of the steps of any of the Group A embodiments.

58. A computer program, the computer program comprising instructions which when executed on a computer perform any of the steps of any of the Group B embodiments.

59. A computer program product comprising a computer program, the computer program comprising instructions which when executed on a computer perform any of the steps of any of the Group B embodiments.

60. A non-transitory computer-readable storage medium or carrier comprising a computer program, the computer program comprising instructions which when executed on a computer perform any of the steps of any of the Group B embodiments.

61. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

62. The communication system of the pervious embodiment further including the base station.

63. The communication system of the previous 2 embodiments, further including the UE, wherein the UE is configured to communicate with the base station.

64. The communication system of the previous 3 embodiments, wherein:

the processing circuitry of the host computer is configured to execute a host application, thereby providing the user data; and the UE comprises processing circuitry configured to execute a client application associated with the host application.

65. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

66. The method of the previous embodiment, further comprising, at the base station, transmitting the user data.

67. The method of the previous 2 embodiments, wherein the user data is provided at the host computer by executing a host application, the method further comprising, at the UE, executing a client application associated with the host application.

68. A user equipment (UE) configured to communicate with a base station, the UE comprising a radio interface and processing circuitry configured to performs the of the previous 3 embodiments.

69. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

70. The communication system of the previous embodiment, wherein the cellular network further includes a base station configured to communicate with the UE.

71. The communication system of the previous 2 embodiments, wherein:

the processing circuitry of the host computer is configured to execute a host application, thereby providing the user data; and the UE's processing circuitry is configured to execute a client application associated with the host application.

72. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

73. The method of the previous embodiment, further comprising at the UE, receiving the user data from the base station.

74. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

75. The communication system of the previous embodiment, further including the UE.

76. The communication system of the previous 2 embodiments, further including the base station, wherein the base station comprises a radio interface configured to communicate with the UE and a communication interface configured to forward to the host computer the user data carried by a transmission from the UE to the base station.

77. The communication system of the previous 3 embodiments, wherein:

the processing circuitry of the host computer is configured to execute a host application; and the UE's processing circuitry is configured to execute a client application associated with the host application, thereby providing the user data.

78. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

79. A method implemented in a communication system including a host computer, a base station and a user equipment (UE), the method comprising:

at the host computer, receiving user data transmitted to the base station from the UE, wherein the UE performs any of the steps of any of the Group A embodiments.

80. The method of the previous embodiment, further comprising, at the UE, providing the user data to the base station.

81. The method of the previous 2 embodiments, further comprising:

at the UE, executing a client application, thereby providing the user data to be transmitted; and at the host computer, executing a host application associated with the client application.

82. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

83. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

84. The communication system of the previous embodiment further including the base station.

85. The communication system of the previous 2 embodiments, further including the UE, wherein the UE is configured to communicate with the base station.

86. The communication system of the previous 3 embodiments, wherein:

the processing circuitry of the host computer is configured to execute a host application;

the UE is configured to execute a client application associated with the host application, thereby providing the user data to be received by the host computer.

87. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

88. The method of the previous embodiment, further comprising at the base station, receiving the user data from the UE.

89. The method of the previous 2 embodiments, further comprising at the base station, initiating a transmission of the received user data to the host computer.

FIG. 31 illustrates an example of a method performed by a wireless device in accordance with certain embodiments. As an example, in certain embodiments, the method may be performed by a wireless device 110 described above. As described above, examples of a wireless device 110 may include a UE 200 described above. In certain embodiments, the wireless device may comprise processing circuitry (e.g., processing circuitry 120 of wireless device 110 or one or more processors 201 of UE 200) configured to perform the steps of the method.

The method begins at step 3102 with receiving SRS configuration information from a network node. The SRS configuration information received in step 3102 indicates a configuration associated with one or more SRS resources. At least a portion of the SRS configuration information is received in one or more MAC-CE messages. In certain embodiments, a portion of the SRS configuration information is also received in RRC signaling. For example, the RRC signaling may be received in order to initialize the SRS configuration information, and the one or more MAC CE messages may be received sometime after initializing the SRS configuration information in order to update the SRS configuration information. In certain embodiments, updating the SRS configuration information facilitates activating/deactivating different SRS resources based on wireless device capabilities, radio conditions, network conditions, wireless device performance, and/or other suitable factors. In this manner, MAC-CE messages may enable fast and overhead-efficient adaptation of a configuration associated with one or more SRS resources.

Various options are available for the SRS configuration information, including the examples described below.

In certain embodiments, the SRS configuration information indicates which antennas of the wireless device are to be sounded. In certain embodiments, the SRS configuration information indicates an ASC (antenna switching configuration).

In certain embodiments, the one or more MAC-CE messages comprise one or more SRS resource identifiers and, for each SRS resource identifier, an indication whether to use an SRS resource corresponding to said SRS resource identifier. For example, the SRS configuration information may indicate to activate or deactivate one or more of the indicated SRS resources.

In certain embodiments, the SRS configuration information indicates the configuration according to one or more SRS resource sets. For example, each of the indicated SRS resource set(s) may comprise at least one of the SRS resources to be configured based on the SRS configuration information. In certain embodiments, the SRS configuration information comprises one or more SRS resource set identifiers. Each SRS resource set identifier indicates a respective set of the SRS resources to which a portion of the SRS configuration information that is associated with said SRS resource set identifier applies. In certain embodiments, the SRS resource set identifier is associated with a list of SRS resource identifiers corresponding to the one or more SRS resources belonging to said SRS resource set. In certain embodiments, the SRS configuration information indicates to activate or deactivate one or more of the SRS resource(s) for a given SRS resource set. In certain embodiments, the SRS configuration information indicates to activate one or more of the SRS resource sets (e.g., activate each SRS resource in said SRS resource set) or to deactivate one or more of the SRS resource sets (e.g., deactivate each SRS resource in said SRS resource set). In certain embodiments, the SRS configuration information indicates to activate or deactivate a given SRS resource with respect to each SRS resource set in which said SRS resource has been configured.

In certain embodiments, the SRS configuration information indicates a number of SRS ports configured per each of the one or more SRS resources. In certain embodiments, the SRS configuration information indicates to change a number of SRS ports for at least one of the one or more SRS resources. In certain embodiments, when the number of SRS ports is reduced, the SRS configuration information further indicates which of the SRS ports should remain configured. In certain embodiments, the SRS configuration information indicates to change a number of SRS ports per SRS resource for one SRS resource set. In certain embodiments, the SRS configuration information indicates to change a number of SRS ports for all of the SRS resources in an SRS resource set.

Further details and examples of the various options are described above, for example, with respect to the headings "Embodiment 1 (MAC-CE is used to activate/deactivate one or multiple SRS resource(s))," "Embodiment 2 (MAC-CE is used to activate/deactivate one or multiple SRS resource(s) for a given SRS resource set)," "Embodiment 3 (MAC-CE is used to change the number of SRS ports for one or multiple SRS resources)," "Embodiment 4 (MAC-CE is used to change the number of SRS ports for all the SRS resources in an SRS resource set)," "Embodiment 5 (MAC-CE is used to change the number of SRS ports per SRS resource for one SRS resource set)," and "Embodiment 6 (MAC-CE is used to change the number of SRS ports for one or multiple SRS resources and when the number of SRS ports are reduced, the MAC-CE can indicate which SRS ports that should remain (and in that way implicitly indicate which UE antennas to be sounded))."

The method proceeds to step 3104 with configuring the one or more SRS resources based at least in part on the SRS configuration information. For example, the wireless device may activate SRS resources that the configuration information indicates to activate and may deactivate SRS resources that the configuration information indicates to deactivate.

In certain embodiments, the method further comprises sending one or more SRSs to the network node using the configured one or more SRS resources, as shown in step 3106. Sending the one or more SRSs to the network node may enable the network node to use information determined based on the SRSs to perform one or more operations of the network node, such as scheduling, link adaptation, MIMO operations, and/or beam management.

FIG. 32 illustrates an example of a method performed by a network node in accordance with certain embodiments. As an example, in certain embodiments, the method may be performed by a network node 160 described above. In certain embodiments, the network node may comprise processing circuitry (e.g., processing circuitry 170) configured to perform the steps of the method. In some embodiments, certain aspects of the methods of FIG. 31 and FIG. 32 may generally be reciprocal. For example, FIG. 31 may describe receiving/sending certain information from the perspective of a wireless device, and FIG. 32 may describe reciprocal steps of sending/receiving the information from the perspective of a network node that communicates with the wireless device.

In certain embodiments, the method begins at step 3202 with SRS configuration information to be sent to a wireless device. The SRS configuration information indicates a configuration associated with one or more SRS resources. Certain embodiments determine the SRS configuration information based at least in part on capability information received from the wireless device. The capability information indicates that the wireless device supports multiple antenna switching configurations. In addition, or in the alternative, certain embodiments determine the SRS configuration information based at least in part on radio conditions, network conditions, wireless device performance, and/or other suitable factors.

Various options are available for the SRS configuration information, including the examples described below.

In certain embodiments, the SRS configuration information indicates which antennas of the wireless device are to be sounded. In certain embodiments, the SRS configuration information indicates an ASC (antenna switching configuration).

The SRS configuration information may indicate to activate or deactivate one or more SRS resources. As an example, certain embodiments use one or more SRS resource identifiers. Each SRS resource identifier indicates whether to activate or deactivate an SRS resource corresponding to said SRS resource identifier.

In certain embodiments, the SRS configuration information indicates the configuration according to one or more SRS resource sets. For example, each of the indicated SRS resource set(s) may comprise at least one of the SRS resources to be configured based on the SRS configuration information. In certain embodiments, the SRS configuration information comprises one or more SRS resource set identifiers. Each SRS resource set identifier indicates a respective set of the SRS resources to which a portion of the SRS configuration information that is associated with said SRS resource set identifier applies. In certain embodiments, the SRS resource set identifier is associated with a list of SRS resource identifiers corresponding to the one or more SRS resources belonging to said SRS resource set. In certain embodiments, the SRS configuration information indicates to activate or deactivate one or more of the SRS resource(s) for a given SRS resource set. In certain embodiments, the SRS configuration information indicates to activate one or more of the SRS resource sets (e.g., activate each SRS resource in said SRS resource set) or to deactivate one or more of the SRS resource sets (e.g., deactivate each SRS resource in said SRS resource set). In certain embodiments, the SRS configuration information indicates to activate or deactivate a given SRS resource with respect to each SRS resource set in which said SRS resource has been configured.

In certain embodiments, the SRS configuration information indicates a number of SRS ports configured per each of the one or more SRS resources. In certain embodiments, the SRS configuration information indicates to change a number of SRS ports for at least one of the one or more SRS resources. In certain embodiments, when the number of SRS ports is reduced, the SRS configuration information further indicates which of the SRS ports should remain configured. In certain embodiments, the SRS configuration information indicates to change a number of SRS ports per SRS resource for one SRS resource set. In certain embodiments, the SRS configuration information indicates to change a number of SRS ports for all of the SRS resources in an SRS resource set.

Further details and examples of the various options are described above, for example, with respect to the headings "Embodiment 1 (MAC-CE is used to activate/deactivate one or multiple SRS resource(s))," "Embodiment 2 (MAC-CE is used to activate/deactivate one or multiple SRS resource(s) for a given SRS resource set)," "Embodiment 3 (MAC-CE is used to change the number of SRS ports for one or multiple SRS resources)," "Embodiment 4 (MAC-CE is used to change the number of SRS ports for all the SRS resources in an SRS resource set)," "Embodiment 5 (MAC-CE is used to change the number of SRS ports per SRS resource for one SRS resource set)," and "Embodiment 6 (MAC-CE is used to change the number of SRS ports for one or multiple SRS resources and when the number of SRS ports are reduced, the MAC-CE can indicate which SRS ports that should remain (and in that way implicitly indicate which UE antennas to be sounded)).”

The method proceeds to step 3204 with sending the SRS configuration information to the wireless device. At least a portion of the SRS configuration information is sent in one or more MAC-CE messages. In certain embodiments, a portion of the SRS configuration information is also received in RRC signaling. For example, the RRC signaling may be sent in order to initialize the SRS configuration information, and the one or more MAC CE messages may be sent sometime after initializing the SRS configuration information in order to update the SRS configuration information. In certain embodiments, updating the SRS configuration information facilitates activating/deactivating different SRS resources based on wireless device capabilities, radio conditions, network conditions, wireless device performance, and/or other suitable factors. In this manner, MAC-CE messages may enable fast and overhead-efficient adaptation of a configuration associated with one or more SRS resources.

Certain embodiments further include receiving one or more SRSs from the wireless device, as shown in step 3206. The SRSs are received via one or more SRS resources configured according to the SRS configuration information sent to the wireless device in step 3204. For example, the network node receives an SRS via an SRS resource that the SRS configuration information indicates to keep as activated (if already activated) or to change to activated (if not already activated). The network node may abstain from receiving the SRS via an SRS resource that the SRS configuration information indicates to keep as deactivated (if already deactivated) or to change to deactivated (if not already deactivated). Certain embodiments use information determined based on the SRSs received in step 3206 to perform one or more operations of the network node, as shown in step 3208. For example, the information determined based on the SRSs received in step 3206 may be used for at least one of scheduling, link adaptation, MIMO operations, and/or beam management.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, “each” refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:

receiving sounding reference signal (SRS) configuration information from a network node, the SRS configuration information indicating a configuration associated with one or more SRS resources, wherein at least a portion of the SRS configuration information is received in one or more Medium Access Control-Control Element (MAC-CE) messages, wherein the one or more MAC-CE messages comprise one or more SRS resource identifiers and, for each SRS resource identifier, an indication whether to use an SRS resource corresponding to said SRS resource identifier; and configuring the one or more SRS resources based at least in part on the SRS configuration information.

2. A method performed by a network node, the method comprising:

sending sounding reference signal (SRS) configuration information to a wireless device, the SRS configuration information indicating a configuration associated with one or more SRS resources, wherein at least a portion of the SRS configuration information is sent in one or more Medium Access Control-Control Element (MAC-CE) messages, wherein the one or more MAC-CE messages comprise one or more SRS resource identifiers and, for each SRS resource identifier, an indication whether to use an SRS resource corresponding to said SRS resource identifier.

3. The method of claim 2, further comprising receiving one or more SRSs from the wireless device configured according to the SRS configuration information.

4. The method of claim 3, further comprising using information determined based on the SRSs to perform at least one of: scheduling, link adaptation, MIMO operations, and/or beam management.

5. The method of claim 2, further comprising, prior to sending the SRS configuration information to the wireless device, determining the SRS configuration information to be sent.

6. The method of claim 5, wherein the SRS configuration information is determined based at least in part on capability information received from the wireless device, the capability information indicating that the wireless device supports multiple antenna switching configurations.

7. The method of claim 5, wherein the SRS configuration information is determined based at least in part based on radio conditions, network conditions, and/or wireless device performance.

8. The method of claim 2, wherein the SRS configuration information indicates a number of SRS ports configured per each of the one or more SRS resources.

9. The method of claim 2, wherein the SRS configuration information indicates the configuration according to one or more SRS resource sets.

10. The method of claim 9, wherein each of the indicated SRS resource set(s) comprises at least one of the SRS resources to be configured based on the SRS configuration information.

11. The method of claim 2, wherein the SRS configuration information comprises one or more SRS resource set identifiers, each SRS resource set identifier indicating a respective set of the SRS resources to which a portion of the SRS configuration information that is associated with said SRS resource set identifier applies.

12. The method of claim 11, wherein the SRS resource set identifier is associated with a list of SRS resource identifiers corresponding to the one or more SRS resources belonging to said SRS resource set.

13. The method of claim 2, wherein the SRS configuration information indicates to activate or deactivate one or more of the indicated SRS resources.

14. The method of claim 2, wherein the SRS configuration information indicates to activate or deactivate one or more of the SRS resource sets, wherein activating a given SRS resource set comprises activating each SRS resource in said SRS resource set and deactivating the given SRS resource set comprises deactivating each SRS resource in said SRS resource set.

15. The method of claim 2, wherein the SRS configuration information indicates to activate or deactivate a given SRS resource with respect to each SRS resource set in which said SRS resource has been configured.

16. The method of claim 2, wherein the SRS configuration information indicates to activate or deactivate one or more of the SRS resource(s) for a given SRS resource set.

17. The method of claim 2, wherein the SRS configuration information indicates to change a number of SRS ports for at least one of the one or more SRS resources.

18. The method of claim 17, wherein, when the number of SRS ports is reduced, the SRS configuration information further indicates which of the SRS ports should remain configured.

19. The method of claim 2, wherein the SRS configuration information indicates which antennas of the wireless device are to be sounded.

20. The method of claim 2 wherein the SRS configuration information indicates to change a number of SRS ports for all of the SRS resources in an SRS resource set.

21. The method of claim 2, wherein the SRS configuration information indicates to change a number of SRS ports per SRS resource for one SRS resource set.

22. The method of claim 2, wherein the SRS configuration information indicates an antenna switching configuration (ASC).

23. The method of claim 2, further comprising: sending at least a portion of the SRS configuration information in radio resource control (RRC) signaling.

24. The method of claim 23, wherein the RRC signaling initializes the SRS configuration information and the one or more MAC CE messages update the SRS configuration information.

25. A wireless device, the wireless device comprising:

power supply circuitry configured to supply power to the wireless device; and processing circuitry configured to:

receive sounding reference signal (SRS) configuration information from a network node, the SRS configuration information indicating a configuration associated with one or more SRS resources, wherein at least a portion of the SRS configuration information is received in one or more Medium Access Control-Control Element (MAC-CE) messages, wherein the one or more MAC-CE messages comprise one or more SRS resource identifiers and, for each SRS resource identifier, an indication whether to use an SRS resource corresponding to said SRS resource identifier; and configure the one or more SRS resources based at least in part on the SRS configuration information.

26. A network node, the network node comprising:

power supply circuitry configured to supply power to the network node; and processing circuitry configured to:

send sounding reference signal (SRS) configuration information to a wireless device, the SRS configuration information indicating a configuration associated with one or more SRS resources, wherein at least a portion of the SRS configuration information is sent in one or more Medium Access Control-Control Element (MAC-CE) messages, wherein the one or more MAC-CE messages comprise one or more SRS resource identifiers and, for each SRS resource identifier, an indication whether to use an SRS resource corresponding to said SRS resource identifier.

* * * * *